(12) United States Patent
Latsko

(10) Patent No.: US 6,637,568 B2
(45) Date of Patent: Oct. 28, 2003

(54) CLUTCH-BRAKE ASSEMBLY

(75) Inventor: James M. Latsko, Parma, OH (US)

(73) Assignee: Eaton Corporation, Cleveland, OH (US)

( * ) Notice: Subject to any disclaimer, the term of this patent is extended or adjusted under 35 U.S.C. 154(b) by 8 days.

(21) Appl. No.: 09/837,737

(22) Filed: Apr. 17, 2001

(65) Prior Publication Data

US 2002/0148695 A1 Oct. 17, 2002

(51) Int. Cl.$^7$ ................................................ F16D 67/04
(52) U.S. Cl. .................................. 192/18 A; 192/85 AA
(58) Field of Search ............................. 192/18 R, 18 A, 192/15, 85 AA, 89.26, 70.16; 277/565, 606, 551, 562, 570, 573

(56) References Cited

U.S. PATENT DOCUMENTS

| | | | |
|---|---|---|---|
| 3,957,381 A | | 5/1976 | Schafer |
| 4,025,213 A | | 5/1977 | Schafer et al. |
| 4,785,926 A | * | 11/1988 | Matson ...................... 192/18 A |
| 4,874,068 A | * | 10/1989 | Collins et al. ............ 192/18 A |
| 4,901,830 A | * | 2/1990 | Dolby ....................... 192/18 A |
| 4,970,945 A | * | 11/1990 | Schmidt ....................... 92/107 |
| 5,046,593 A | | 9/1991 | Collins et al. |
| 5,257,684 A | | 11/1993 | Collins |
| 5,577,581 A | | 11/1996 | Eberwein et al. |
| 5,873,444 A | * | 2/1999 | Kozhevnikov et al. ... 192/18 A |
| 5,993,102 A | * | 11/1999 | Miyako ....................... 403/370 |
| 6,099,199 A | * | 8/2000 | Mullenberg ................. 403/370 |
| 6,145,558 A | * | 11/2000 | Schmitz ....................... 152/416 |
| 6,290,470 B1 | * | 9/2001 | Okuno et al. ............... 417/269 |

FOREIGN PATENT DOCUMENTS

| | | |
|---|---|---|
| EP | 0227474 | 12/1986 |
| GB | 553452 | 2/1942 |
| GB | 875493 | 8/1959 |
| GB | 2229778 | 3/1990 |

OTHER PUBLICATIONS

B–Lock Corp. publication entitled "A Complete Line of Keyless Shaft/Hub Connectors", publication date unknown but prior to Mar. 1, 2001.

Publication by Goizper Corporation entitled "Pneumatic Clutch/Brake Combinations", publication date unknown but prior to Mar. 1, 2001.

Publication by Ompi Corporation entitled "Air Actuated Clutch–Brake Unit–Series HT", publication date unknown but prior to Mar. 1, 2001.

Publication by Prodan Corporation entitled "Kupplengs–Brems–Combinationen Clutch–Brake Units", publication date unknown but prior to Mar. 1, 2001.

(List continued on next page.)

Primary Examiner—Richard M. Lorence
Assistant Examiner—David D. Le
(74) Attorney, Agent, or Firm—Tarolli, Sundheim, Covell & Tummino L.L.P.

(57) ABSTRACT

A clutch-brake assembly is utilized to rotate a shaft and transmit force to retain the shaft against rotation. The clutch-brake assembly includes a wedge member which is disposed in a central opening in a base member. An actuator is operable to move the wedge member relative to the base member. A seal assembly is disposed in the central opening in the base member. A plurality of force transmission members transmit force when a friction surface is pressed against a clutch surface and when a friction surface is pressed against a brake surface. Each of the force transmission members extends around and at least partially encloses a spring. Guide members are advantageously utilized to position components of the clutch-brake assembly relative to each other during formation of the clutch-brake assembly.

85 Claims, 11 Drawing Sheets

OTHER PUBLICATIONS

Publication by Ortlinghaus entitled "Clutch/Brake Replacement and Conversions for Metal Forming Machinery", publication date unknown but prior to Mar. 1, 2001.

Publication by Desch entitled "Lutex Clutch–Brake Combinations", publication date unknown but prior to Mar. 1, 2001.

Publication by Wichita entitled "Combination Clutch/Brake", publication date unknown but prior to Mar. 1, 2001.

Publication by Eaton Corporation entitled "Airflex–Clutches and Brakes", copyright 1995.

Article entitled "Composite Sketch" by Benjamin Shobert in PTDesign, Jul. 2000, p. 19.

Publication entitled "A Design Guide to Polylube Self–Lubricating Bearings—Composites", by Polygon Company, publication date unknown but prior to Mar. 1, 2001.

* cited by examiner

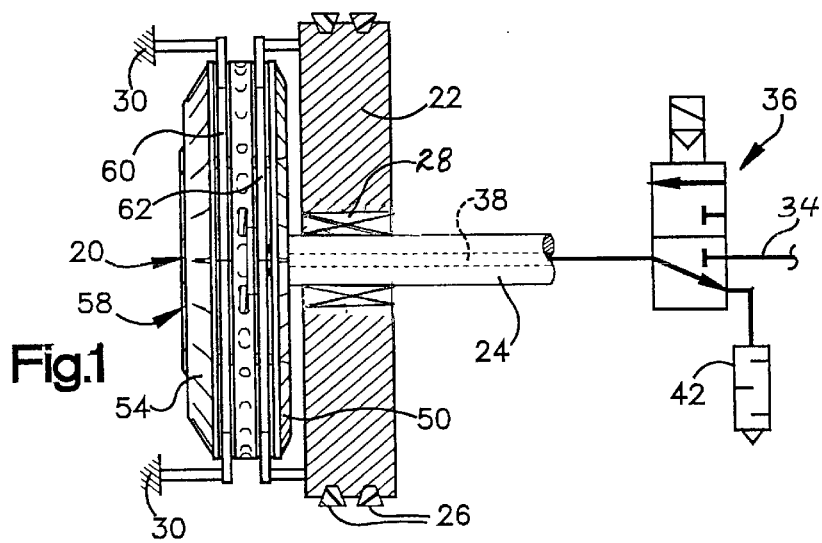
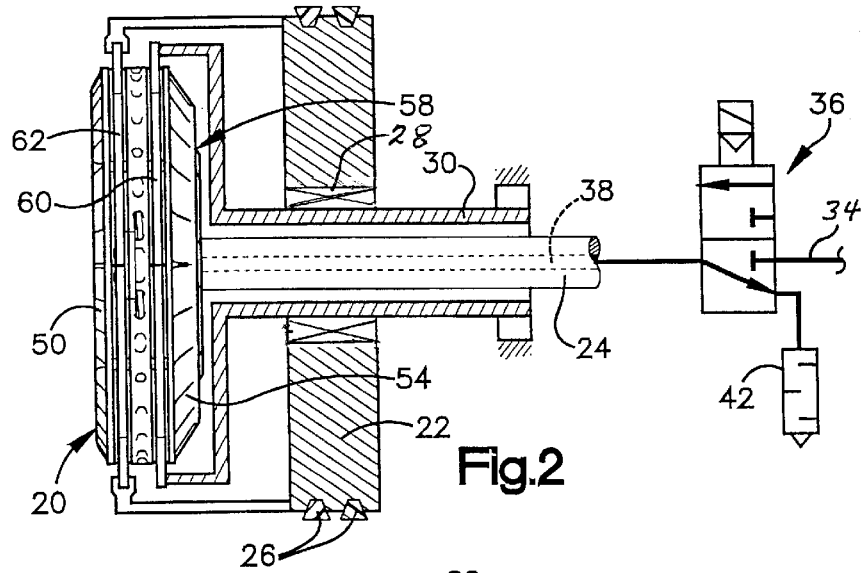
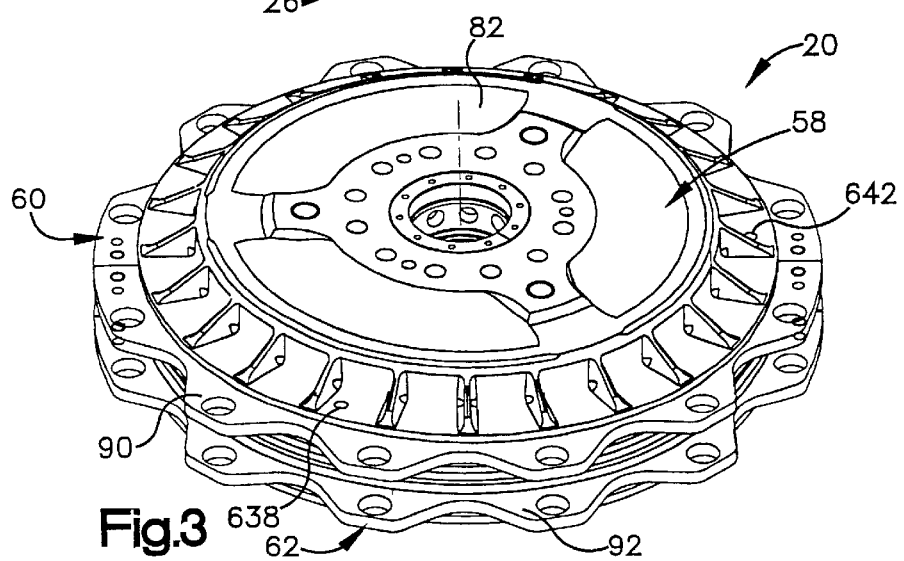

CLUTCH-BRAKE ASSEMBLY

BACKGROUND OF THE INVENTION

The present invention relates to a clutch-brake assembly which is utilized to transmit force to rotate a shaft and to transmit force to retain the shaft against rotation.

Known clutch-brake assemblies have previously been connected with a shaft by the use of a key which fits into a slot in the shaft and into a slot in the clutch-brake assembly. Various types of seals have been utilized in fluid connections to connect the known clutch-brake assemblies in communication with a source of fluid under pressure and to exhaust the clutch-brake assembly to the environment around the clutch-brake assembly. These known clutch-brake assemblies have been utilized in association with can-making machines, press drives, and shear drives. Known clutch-brake assemblies are disclosed in U.S. Pat. Nos. 5,046,593; 5,257,684; and 5,577,581.

SUMMARY OF THE INVENTION

The present invention relates to a clutch-brake assembly which may include a base member having a central opening which receives a shaft. A clutch surface may be movable relative to the base member. A brake surface may be movable relative to the base member. A piston may be movable in a first direction relative to the base member to press a first friction surface against the clutch surface to enable force to be transmitted from the clutch surface. The piston may be movable in a second direction to press a second friction surface against the brake surface.

A wedge member may be utilized to connect the base member of the clutch-brake assembly with the shaft. An actuator may be operable to move the wedge member relative to the base member to interconnect the base member and shaft for rotation together about a central axis of the base member.

A seal assembly may be provided to define a path along which fluid pressure is conducted. The seal assembly may include an actuator which is operable to decrease the size of an annular recess in which a seal element is disposed. The seal assembly may include a retaining section which is pressed against an outer surface of the base member and/or shaft to retard movement of the seal assembly relative to the shaft.

A plurality of force transmission members may be provided to transmit force between components of the clutch-brake assembly. Bearing surfaces may be provided by resilient members which at least partially enclose the force transmission members. The force transmission members may extend around and at least partially enclose springs which apply biasing force against components of the clutch-brake assembly.

The clutch-brake assembly may be assembled by the use of a plurality of guide members. The guide members engage components of the clutch-brake assembly to facilitate positioning of the components of the clutch-brake assembly relative to each other.

The present invention has a plurality of features which may or may not have been previously mentioned herein. Each of the features may be used alone or in combination with one or more other features. One or more of the features may be used in combination with known features of similar devices.

BRIEF DESCRIPTION OF THE DRAWINGS

The foregoing and other features of the present invention will become more apparent upon a consideration of the following description taken in connection with the accompanying drawings wherein:

FIG. 1 is a simplified schematic illustration depicting the manner in which a clutch-brake assembly constructed in accordance with the present invention may be mounted in a first orientation to transmit force to rotate a shaft and to transmit force to retain the shaft against rotation;

FIG. 2 is a simplified schematic illustration, generally similar to FIG. 1, illustrating how the clutch-brake assembly may be mounted in a second orientation to transmit force to rotate the shaft and to transmit force to retain the shaft against rotation;

FIG. 3 is a simplified pictorial illustration of the clutch-brake assembly of FIGS. 1 and 2;

DESCRIPTION OF SPECIFIC PREFERRED EMBODIMENTS OF THE INVENTION

General Description

Figure 4:
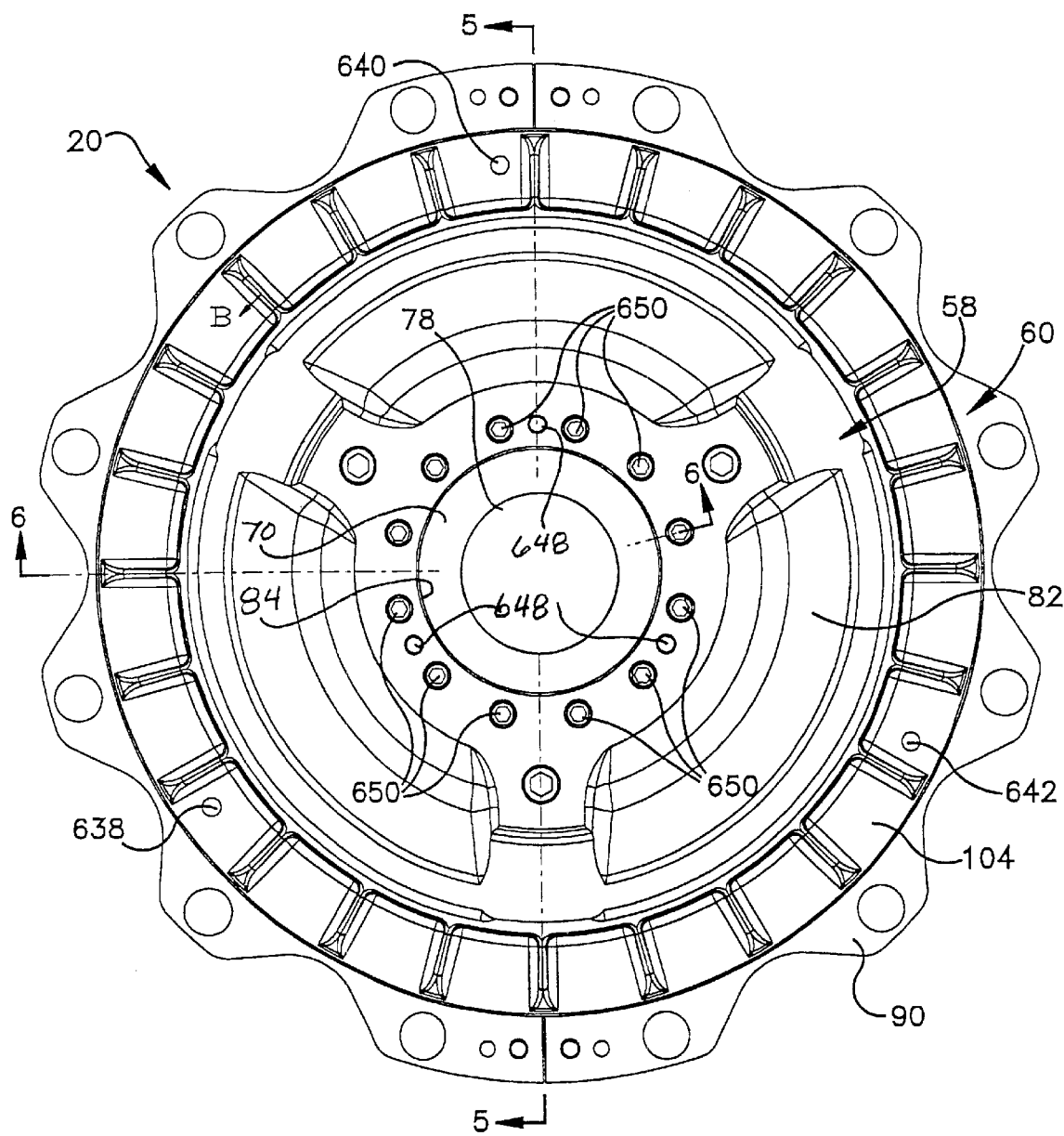
FIG. 4 is a plan view of one embodiment of the clutch-brake assembly of FIGS. 1 and 2.

A clutch-brake assembly 20 (FIG. 1) is operable between an engaged condition and a disengaged condition. When the clutch-brake assembly 20 is in the engaged condition, the clutch-brake assembly is effective to transmit force from a drive member 22 to a driven member 24.

The illustrated drive member 22 is a circular flywheel which is driven by belts 26 which extend around the periphery of the flywheel. The illustrated driven member 24 is a metal shaft which is rotated about its longitudinal central axis under the influence of force transmitted from the flywheel 22 through the clutch-brake assembly 20 to the shaft. The shaft 24 and flywheel 22 may be mounted on bearing 28 for rotation relative to each other in a manner generally similar to that disclosed in U.S. Pat. No. 5,577,581. However, the flywheel 22 and shaft 24 could be mounted in a different manner if desired. It should be understood that the flywheel 22 and shaft 24 are merely representative of many different known drive and driven members.

When the clutch-brake assembly 20 is in the disengaged condition, the clutch-brake assembly transmits force from a stationary member or frame 30 to hold the shaft 24 against rotation. The stationary frame 30 may be any desired structure which is stationary. When disengaged, the clutch-brake assembly 20 interconnects the stationary frame 30 and the shaft 24 so that the shaft does not rotate.

The clutch-brake assembly 20 is operated to the engaged condition by fluid pressure, that is, air. The fluid pressure is conducted from a source conduit 34 through a solenoid operated valve 36 to a central passage 38 in the shaft 24. The clutch-brake assembly 20 is connected in fluid communication with the central passage 38 in the shaft 24.

When the valve 36 is in the unactuated condition illustrated schematically in FIG. 1, the passage 38 in the shaft 24 and the clutch-brake assembly 20 are exhausted to atmosphere through a muffler 42. At this time, the clutch-brake assembly 20 connects the shaft 24 with the stationary frame 30 to hold the shaft against rotation.

Upon actuation of the valve 36, the source conduit 34 is connected in fluid communication with the shaft passage 38. Fluid pressure conducted through the shaft passage 38 to the clutch-brake assembly 20 actuates the clutch-brake assembly to the engaged condition. When the clutch-brake assembly 20 is in the engaged condition, force is transmitted from the flywheel 22 through the clutch-brake assembly to the shaft 24 to rotate the shaft about its longitudinal central axis. It is contemplated that the shaft 24 may be connected with many different types of equipment. For example, the clutch-brake assembly 20 may be utilized to transmit power to a can-forming machine.

During the forming of cans, the load transmitted from components of the machine to the clutch-brake assembly 20 varies in a range between +12,500 pound inches and −2,500 pound inches. The cyclically varying torque load is applied to the clutch-brake assembly 20 while the clutch-brake assembly is rotating at a speed of 645 revolutions per minute or more. One specific can-forming machine operated at a rate of 325 cycles per minute and a speed of 838 revolutions per minute, the load transmitted from components of the machine to an associated clutch-brake assembly varied in a range between +35,000 pound inches and −19,000 pound inches. The manner in which a load which is applied to the clutch-brake assembly 20 of FIG. 1 may vary when the clutch-brake assembly is associated with a can-forming machine is disclosed in U.S. Pat. No. 5,046,593.

Although the clutch-brake assembly 20 may be associated with can-forming machines, it is contemplated that the clutch-brake assembly will be utilized in association with other known machines requiring acceleration and deceleration of components of the machine and relatively high disengaging and engaging frequencies. The machines with which the clutch-brake assembly 20 is associated may be for press and/or shear drives. The machines may be single-stroke or continuous-running machines. For example, the clutch-brake assembly 20 could be associated with metal stamping machines, wire processing machines, thread-rolling machines, veneer-cutting machines, bottle-sorting machines, paper processing machines, or textile machines. Of course, it should be understood that the clutch-brake assembly 20 could be associated with other known types of machines if desired.

The clutch-brake assembly 20 has been illustrated schematically in FIG. 1 in an environment in which one end, that is, a hub or base member end 50 of the clutch-brake assembly is blocked by the flywheel 22. However, a cylinder or cover member end 54 of the clutch-brake assembly is accessible.

In the arrangement illustrated in FIG. 2, the clutch-brake assembly 20 is connected with the shaft 24 and flywheel 22 in a manner which blocks access to the cylinder or cover member end 54 and which provides access to the hub or base member end 50. In accordance with one of the features of the present invention, components of the clutch-brake assembly 20 may be arranged so that access to the components can be obtained from the cylinder or cover member end 54, when the clutch-brake assembly is mounted in the arrangement illustrated schematically in FIG. 1, or can be obtained from the hub or base member end 50, when the clutch-brake assembly 20 is mounted in the arrangement illustrated schematically in FIG. 2.

The clutch-brake assembly 20 (FIGS. 3, 4 and 5) includes a body assembly 58, a brake disc 60 and a clutch disc 62. The brake disc 60 (FIGS. 3 and 5) is connected with the body assembly 58. The brake disc 60 is freely rotatable relative to the body assembly 58 when the clutch-brake assembly 20 is in the engaged condition. The clutch disc 62 is also connected with the body assembly 58. The clutch disc 62 is freely rotatable relative to the body assembly 58 when the clutch-brake assembly 20 is in the disengaged condition.

In addition, the brake and clutch discs 60 and 62 are axially movable, through a limited range of movement, relative to the body assembly 58. The brake and clutch discs 60 and 62 have a generally annular configuration. The body assembly 58 extends through openings in the central portion of the brake disc 60 and the clutch disc 62. Regardless of the orientation in which the clutch-brake assembly 20 is disposed, that is, either the orientation of FIG. 1, or the orientation of FIG. 2, the brake disc 60 is connected with a stationary frame or member 30 and the clutch disc 62 is connected with a driving member or flywheel 22. The body assembly 58 of the clutch-brake assembly 20 is fixedly connected to the shaft or other driven member 24.

When the clutch-brake assembly 20 is in the engaged condition, the clutch disc 62 is held against rotation relative to the body assembly 58. At this time, the clutch disc 62 is effective to transmit force from the flywheel 22 to the body assembly 58. This force rotates the body assembly and the shaft 24 about the longitudinal central axis of the shaft. At this time, the body assembly 58 is freely rotatable relative to the brake disc 60.

When the clutch-brake assembly 20 is in the disengaged condition, the body assembly 58 is held against rotation relative to the brake disc 60. This enables force to be transmitted from the stationary frame 30 through the brake disc 60 to the body assembly 58 to hold the body assembly and the shaft 24 against rotation. At this time, the flywheel 22 and clutch disc 62 are freely rotatable together relative to the body assembly 58 and the shaft 24.

Figure 5:
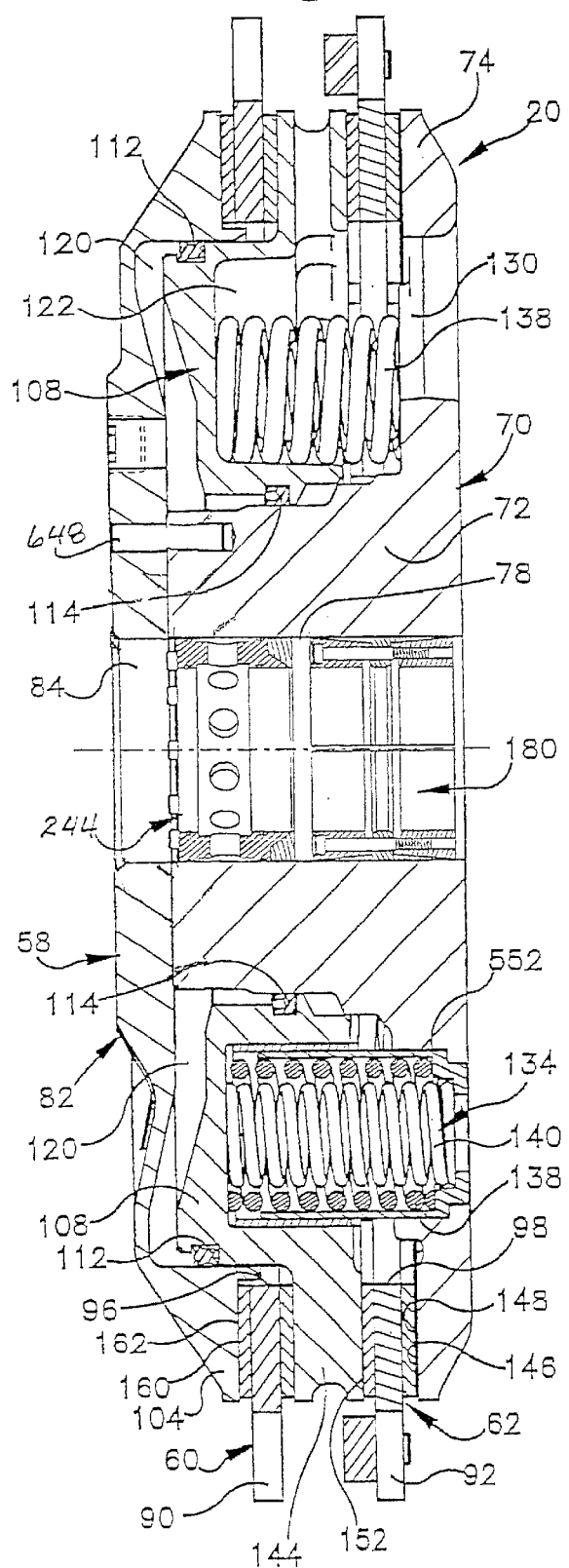
FIG. 5 is a sectional view, taken along the line 5—5 of FIG. 4, illustrating the relationship between a hub or base member, a piston, a cylinder or cover member, and a plurality of springs which apply a biasing force to the piston.
Figure 6:
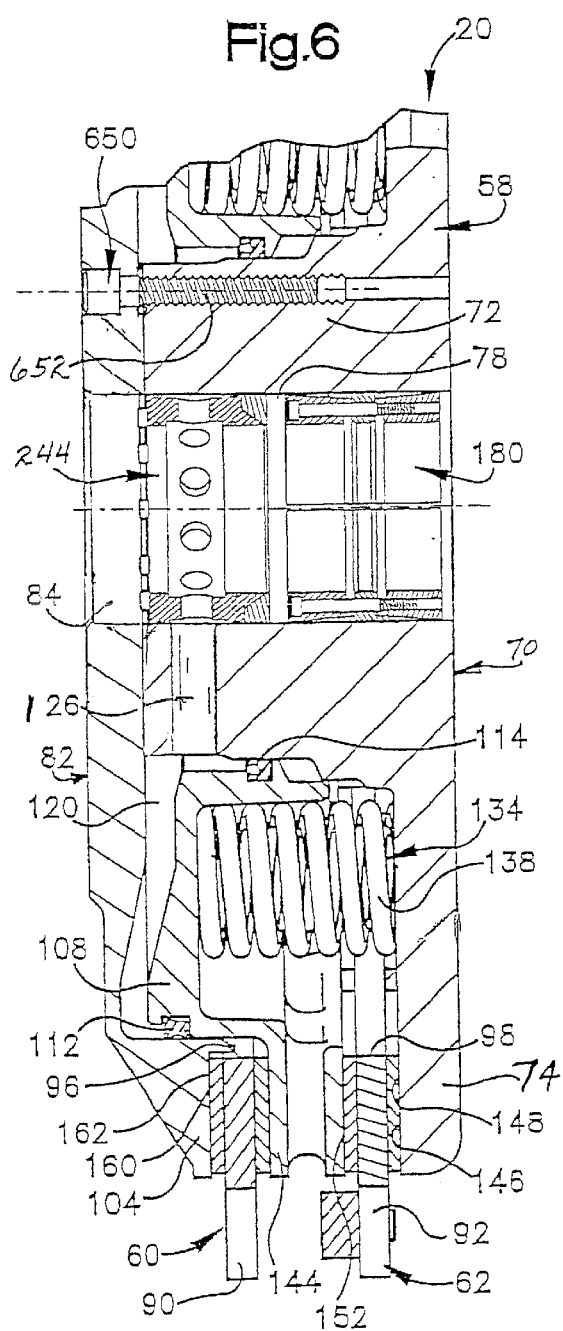
FIG. 6 is fragmentary sectional view, taken generally along the line 6—6 of FIG. 4, further illustrating the relationship of components of the clutch-brake assembly.

The metal body assembly 58 of the clutch-brake assembly 20 includes a metal hub or base member 70 (FIGS. 5 and 6). The hub or base member 70 is cast as one piece of metal and includes a generally cylindrical central section 72. A generally annular flange section 74 is integrally formed as one piece with the central section 72 and extends radially outward from the central section. A cylindrical central opening or passage 78 extends through the central section 72 of the hub or base member 70.

The body assembly 58 also includes a metal cylinder or cover member 82 which is fixedly connected to the hub or base member 70. The cylinder or cover member 82 has a circular central opening 84 which is disposed in a coaxial relationship with and forms a continuation of the central opening 78 in the hub or base member 70.

The annular brake disc 60 and the annular clutch disc 62 are disposed in a coaxial relationship with the circular hub or base member 70 and the circular cylinder or cover member 82. The annular brake disc and clutch disc 60 and 62 have irregular rim portions 90 and 92 (FIG. 3) which facilitate connecting the brake disc 60 with the stationary frame or member 30 (FIG. 1) and connecting the clutch disc 62 with the flywheel 22.

The brake disc 60 has a circular central opening 96 (FIG. 5) which is disposed in a coaxial relationship with the circular central opening 78 in the hub or base member 70. Similarly, the clutch disc 62 has a circular central opening 98 which is disposed in a coaxial relationship with the central opening 78 in the hub or base member 70. The central openings 96 and 98 in the brake disc 60 and clutch disc 62 are of the same size and are smaller in diameter than the flange section 74 of the hub or base member 70 and circular rim portion 104 of the cylinder or cover member 82. Therefore, the brake disc 60 and clutch disc 62 are connected with the body assembly 58 by being retained between the flange section 74 of the hub or base member 70 and the rim portion 104 of the cylinder or cover member 82.

An annular piston 108 (FIG. 5) is disposed between the hub or base member 70 and the cylinder or cover member 82. The metal piston 108 has an annular outer piston ring or seal 112 which is connected with the piston 108 and is disposed in engagement with the cylinder or cover member 82. In addition, the piston 108 has an annular inner piston ring or seal 114 which is disposed in engagement with the central section 72 of the hub or base member 70.

The piston 108 cooperates with the hub or base member 70 and cylinder or cover member 82 to form an annular variable volume fluid chamber 120 and an annular variable volume spring chamber 122. The annular variable volume fluid chamber 120 is connected in fluid communication with the central opening 78 in the hub or base member 72 and with the shaft 24 by a passage 126 (FIG. 6) which extends radially through the central section 72 of the hub or base member 70. The variable volume spring chamber 122 is continuously connected in fluid communication with the atmosphere around the clutch-brake assembly 20 through openings 130 (FIG. 5) formed in the flange section 74 of the hub or base member 70.

Figure 15:
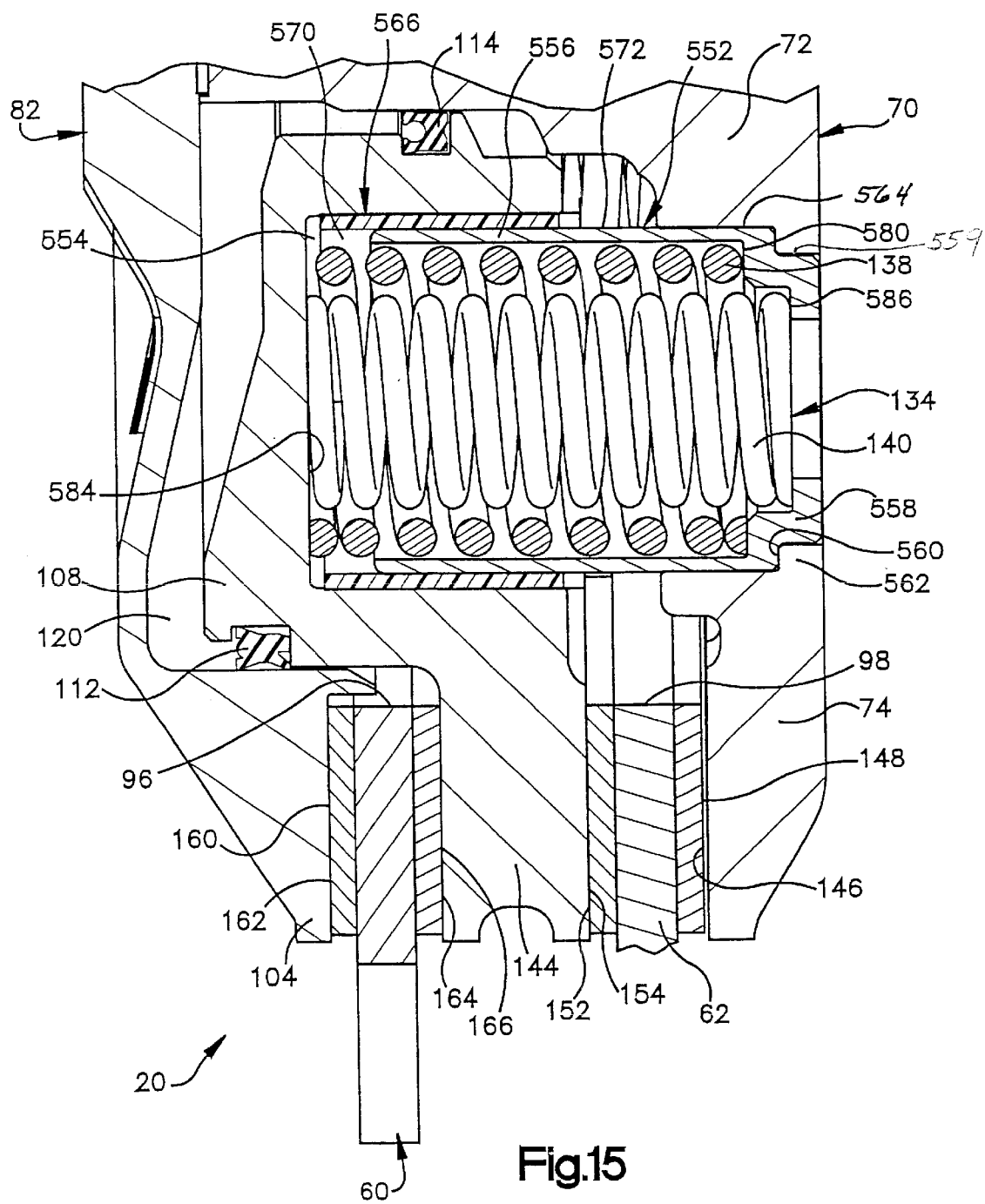
FIG. 15 is an enlarged fragmentary view of a portion of FIG. 5 and illustrating the relationship between the hub or base member, piston, and a force transmitting member in the clutch-brake assembly.

The piston 108 is continuously urged toward the cylinder or cover member 82 by a plurality 134 of springs. The plurality 134 of springs is disposed in an annular array about and in a coaxial relationship with the central section 72 of the hub or base member 70. The plurality 134 of springs includes helical outer coil springs 138 and helical inner coil springs 140. The inner springs 140 are disposed within and in a coaxial relationship with the outer springs 138 (FIGS. 5 and 15). Although it is preferred to provide coaxial inner and outer springs 138 and 140, it is contemplated that a single spring could be utilized if desired.

During operation of the clutch-brake assembly 20, fluid (air) under pressure is conducted through the valve 36 (FIG. 1) to the passage 38 in the shaft 24. The fluid pressure is conducted through an outlet in a cylindrical outer side surface of the shaft 24 to the passage 126 (FIG. 6) in the hub or base member 70. The fluid pressure is conducted into the variable volume fluid chamber 120 formed between the piston 108 and the cylinder or cover member 82.

The fluid pressure is effective to apply force against the piston 108 and to compress the plurality 134 of springs. As this occurs, an annular flange portion 144 (FIGS. 5, 6 and 15) of the piston 120 presses an annular friction surface 146 on the clutch disc 62 firmly against an annular friction surface 148 on the flange section 74 of the hub or base member 70. At the same time, an annular friction surface 152 on the flange section 144 of the piston 108 presses against a second friction surface 154 (FIG. 15) on the clutch disc 62.

This results in force, that is, torque, being transmitted from the flywheel 22 (FIG. 1) through the clutch disc 62 (FIGS. 5, 6 and 15) to the hub or base member 70. The hub or base member 70 is connected with the shaft 24. Torque transmitted from the flywheel 22 through the clutch disc 62 and hub or base member 70 to the shaft 24 is effective to rotate the shaft about its longitudinal central axis.

When the clutch-brake assembly is to be disengaged, the variable volume fluid chamber 120 between the piston 108 and the cylinder or cover member 82 (FIG. 6) is vented to atmosphere through the passage 126 in the hub or base member, the passage 38 in the shaft 24 (FIG. 2), and the valve 36. This results in the plurality 134 of springs 138 and 140 being effective to press the flange portion 144 of the piston 108 against the brake disc 60. This results in an annular friction surface 160 (FIG. 15) on the brake disc 60 being pressed against an annular friction surface 162 on the rim portion 104 of the cylinder or cover member 82. At the same time, an annular friction surface 164 on the flange section 144 of the piston 108 is pressed against a friction surface 166 on the brake disc 60. This results in force being transmitted between the stationary frame or member 30 (FIG. 2) and the shaft 24 through the brake disc 60 and hub or base member 70. The force transmitted through the brake disc 60 is effective to hold the shaft 24 against rotation.

The general construction of the clutch-brake assembly is similar to the construction of the clutch-brake assemblies disclosed in the aforementioned U.S. Pat. Nos. 5,046,593 and 5,257,684. In addition, the general construction of the clutch-brake assembly 20 is similar to the construction of a clutch-brake assembly which is commercially available from Eaton Corporation, Airflex Division, 9919 Clinton Road, Cleveland, Ohio 44144.

Connector Assembly

In accordance with one of the features of the present invention, a connector assembly 180 (FIGS. 5, 6, 7 and 8) provides an improved connection between the hub or base member 70 of the clutch-brake unit 20 and the shaft or driven member 24 (FIG. 2). The connector assembly 180 (FIGS. 7 and 8) includes a pair of annular metal wedge members 182 and 184 mounted on an annular metal collar 186. The collar 186 has a cylindrical outer side surface 188 (FIG. 8) which engages the cylindrical surface 190 forming the cylindrical central opening 78 in the hub or base member 70 (FIG. 8).

The one piece metal collar 186 has a cylindrical configuration. The collar 186 has an annular cross sectional configuration in a plane perpendicular to a central axis of the opening 78. A split or gap 192 (FIG. 7) is formed in the collar 186. The gap 192 enables the collar to be expanded radially outward under the influence of force applied against the collar by the wedge members 182 and 184.

The metal wedge members 182 and 184 have annular configurations. Each of the wedge members 182 and 184 has an annular cross sectional configuration in a plane perpendicular to a central axis of the opening 78. The wedge members 182 and 184, collar 186, and opening 78 are all disposed in a coaxial relationship.

Figure 7:
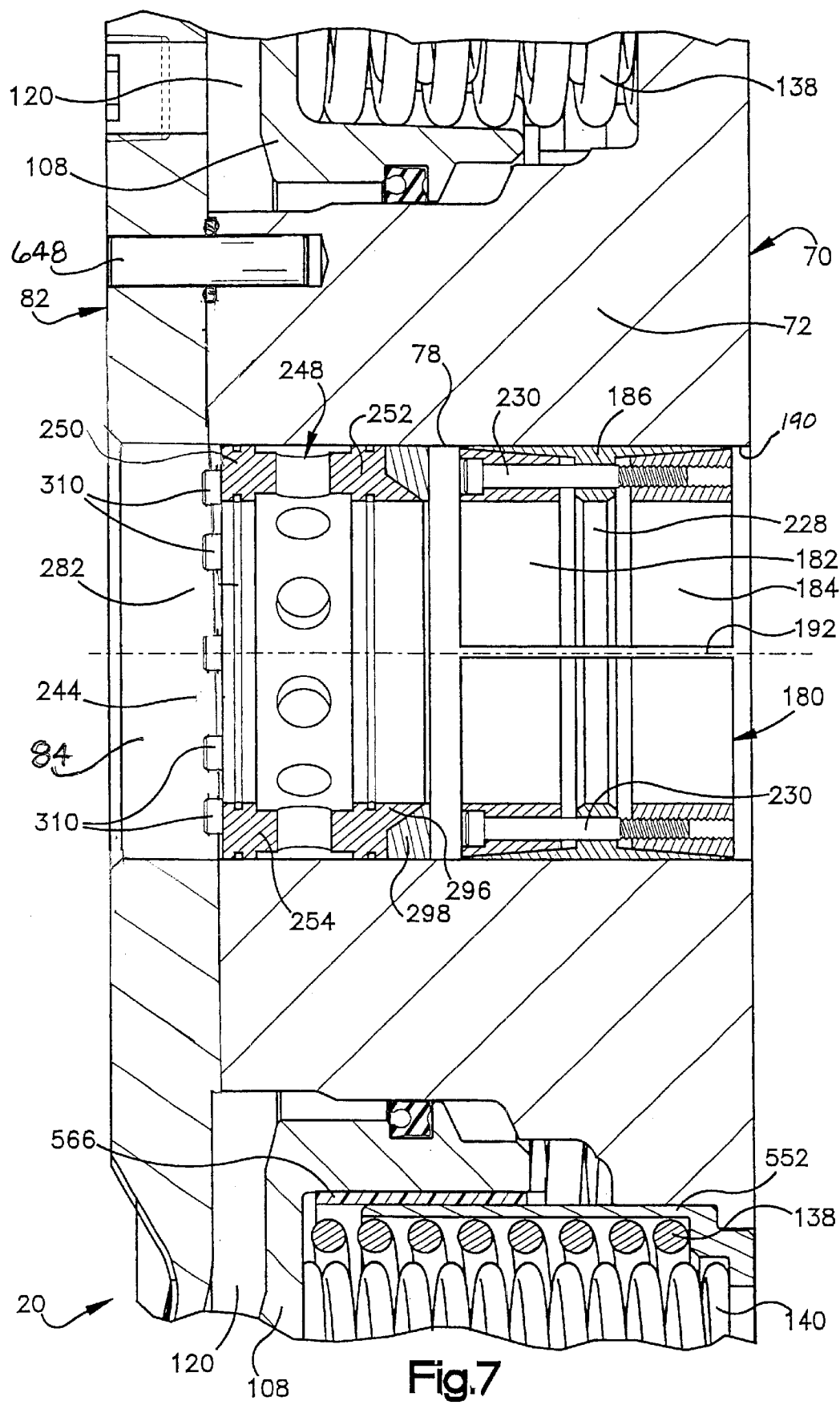
FIG. 7 is an enlarged fragmentary sectional view illustrating the relationship of a connector assembly and a seal assembly to the hub or base member when the clutch-brake assembly is in the orientation illustrated schematically in FIG. 1.
Figure 8:
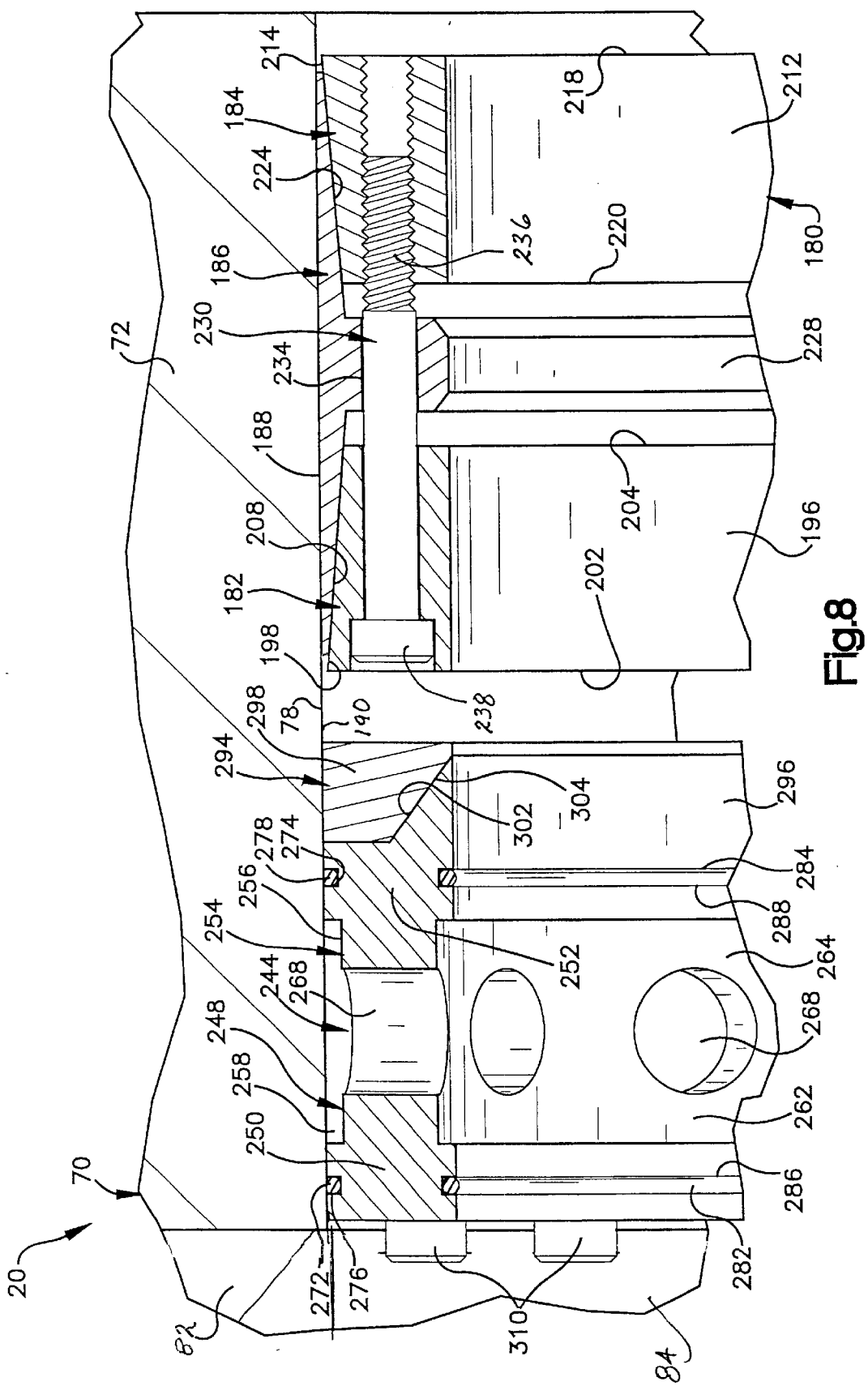
FIG. 8 is an enlarged fragmentary sectional view of a portion of FIG. 7 and further illustrating the construction of the connector assembly and seal assembly.

The wedge member 182 has a cylindrical inner side surface 196 (FIG. 8). The gap 192 (FIG. 7) extends through the inner side surface 196 of the wedge member 182. Therefore, the wedge member 182 can be expanded radially inward into metal-to-metal engagement with the shaft 24 (FIG. 1). At the same time, the collar 186 can be expanded radially outward into metal-to-metal engagement with the hub or base member 70.

The metal wedge member 182 has an outer side surface 198 which is formed as a portion of a right circular cone. The outer side surface 198 of the wedge member 182 has a central axis which is coincident with a central axis of the cylindrical inner side surface 196 of the wedge member. The collar 186 and the central opening 78 have coincident central axes extending through the hub or base member 70. The central axes of the collar 186 and opening 78 are coincident with the central axis of the inner side surface 196 of the wedge member 182.

The wedge member 182 tapers from a relatively thick annular left (as viewed in FIG. 8) end surface 202 to a relatively thin annular right (as viewed in FIG. 8) end surface 204. The thick and thin end surfaces 202 and 204 are flat and extend parallel to each other and perpendicular to a central axis of the central opening 78 in the hub or base member 70.

The frustoconical outer side surface 198 of the wedge member 182 is disposed in abutting engagement with a frustoconical inner side surface 208 on the collar 186. The inner side surface 208 on the collar 186 is formed as a portion of a right circular cone. The outer side surface 198 on the wedge member 182 and the inner side surface 208 on the collar 186 slope at the same acute angle relative to the central axis of the cylindrical opening 78 through the hub or base member 70. Thus, the outer side surface 198 on the wedge member 182 and the inner side surface 208 on the collar 186 are formed as portions of right circular cones having the same configuration.

The wedge member 184 (FIGS. 7 and 8) is a mirror image of the wedge member 182. Thus, the metal wedge member 184 has a cylindrical inner side surface 212 which is split by the gap 192. In addition, the wedge member 184 has an outer side surface 214 which is formed as a portion of a right circular cone. The wedge member 184 tapers from an annular thick right (as viewed in FIG. 8) end surface 218 to a thin left (as viewed in FIG. 8) annular end surface 220. The thick end surface 218 and thin end surface 220 are flat and extend parallel to each other and perpendicular to the longitudinal central axis of the opening 78 through the hub or base member 70.

The axially tapering outer side surface 214 of the wedge member 184 is disposed in engagement with a similarly tapering inner side surface 224 on the collar 186. The surface 224 on the collar 186 is formed as a portion of a right circular cone. The inner surface 224 on the collar 186 and the outer surface 214 on the wedge member 184 are formed as portions of right circular cones having the same configuration.

The collar 186 is formed with an annular central flange or rib 228 which is disposed between and is coaxial with the thin end surfaces 204 and 220 on the wedge members 182 and 184. The flange 228 is split by the gap 192 so that the flange can be expanded radially outward as the outer side surface 188 of the collar 186 is pressed firmly against a cylindrical inner side surface of the central opening 78 extending through the hub or base member 70.

A bolt or actuator member 230 (FIG. 8) extends between the wedge members 182 and 184. The bolt or actuator member 230 is rotatable to draw the two wedge members together toward the flange 228. As this occurs, force is transmitted from the wedge members 182 and 184 to the collar 186 to expand the metal collar radially outward to firmly grip the inner side surface 190 of the opening 78 extending through the metal hub or base member 70. At the same time, camming action between the inner side surfaces 208 and 224 on the collar 186 and the wedge members 182 and 184 causes the metal wedge members to contract radially inward and grip the cylindrical outer side surface of the metal shaft 24.

The metal bolt or actuator 230 extends through a cylindrical opening 234 in the annular flange 228. The opening 234 is large enough in diameter to accommodate radially outward expansion of the collar 186 and the radially inward expansion of the wedge members 182 and 184. Thus, the opening 234 through the flange 228 has a diameter which is large enough to enable the collar 186 to shift radially outward into firm abutting engagement with the inner side surface 190 of the opening 78. The opening 234 is also large enough to enable the wedge members 182 and 184 to shift inward into firm abutting engagement with the outer side surface of the shaft 24.

Tight abutting engagement of the outer side surfaces 198 and 214 (FIG. 8) on the wedge members 182 and 184 with the inner side surfaces 208 and 224 on the collar 186 holds the wedge members against movement relative to the collar. The firm abutting metal-to-metal engagement between the wedge members 182 and 184 and the outer side surface of the shaft 24 holds the wedge members against movement relative to the shaft. Firm abutting metal-to-metal engagement between the outer side surface 188 on the collar 186 and the inner side surface 190 of the opening 78 holds the collar against movement relative to the hub or base member 70. Therefore, when the bolt 230 is tightened to draw the wedge members 182 and 184 axially inward toward each other and toward the flange 228, the connector assembly 180 is effective to securely lock the hub or base member 70 onto the shaft 24 and to hold the clutch-brake assembly 20 against either axial or rotational movement relative to the shaft 24.

Although only a single actuator bolt 230 is illustrated in FIG. 8, it should be understood that there is an annular array of actuator bolts. Each of the bolts 230 extends between the annular wedge members 182 and 184 through openings in the flange 228 of the collar 186. Each bolt 230 of the plurality of bolts has an externally threaded end portion 236 which engages an internal thread in an opening in the wedge member 184. In addition, the bolts 230 all have head end portions 238 disposed in cylindrical recesses adjacent to the thick end surface 202 on the wedge member 182. Therefore, when the bolts 230 are tightened, the wedge members 182 and 184 are pulled together. It is contemplated that the bolts will be sequentially tightened to a greater and greater extent to provide for a gradual pulling of the wedge members 182 and 184 toward each other without cocking or binding of the wedge members.

The general construction and mode of operation of the connector assembly 180 is the same as is disclosed in U.S. Pat. No. 4,025,213. The connector assembly 180 is available from B-Loc Corp. of 26 Gilbert Street, Monroe, N.Y. 10950. However, it is contemplated that the connector assembly 180 could have a construction which is different from the specific construction illustrated in FIGS. 7 and 8. For example, the connector assembly 180 could have a single wedge member 182. The connector assembly 180 could have any one of the constructions illustrated in U.S. Pat. No. 3,957,381. Of course, other known connector assemblies suitable for interconnecting a shaft and a hub could be utilized.

Seal Assembly

In accordance with one of the features of the invention, a seal assembly 244 (FIGS. 7 and 8) is disposed in the central opening 78 with the connector assembly 180. The seal assembly 244 may extend into the central opening 84 in the cylinder or cover member 82. The connector assembly 180 fixedly interconnects the hub or base member 70 and the shaft 24. The seal assembly 244 cooperates with the shaft 24 and hub or base member 70 to form a path along which fluid flows between a radial port connected with the axial passage 38 in the shaft 24 (FIG. 1) and the passage 126 (FIG. 6) formed in the hub or base member 70.

It should be understood that the left (as viewed in FIG. 1) end of the axial passage 38 through the shaft 24 is tightly blocked and that fluid is conducted to and from the passage through a radial port (not shown) and the seal assembly 244. The seal assembly 244 provides a fluid connection between the radial port in the shaft 24 and the passage 126 in the hub or base member 70 (FIG. 6).

The seal assembly 244 (FIGS. 7 and 8) includes a generally cylindrical body 248 (FIGS. 8, 10 and 11) which is integrally formed as one piece of metal. The metal body 248 includes a pair of annular flange sections 250 and 252 which are interconnected by a cylindrical side wall 254. The flange sections 250 and 252 extend radially outward from the side wall 254.

A cylindrical outer side surface 256 (FIG. 8) on the side wall 254 is spaced from and is coaxial with the cylindrical inner side surface 190 of the opening 78 through the hub or base member 70. This results in the formation of an annular outer manifold chamber 258. The outer manifold chamber 258 extends axially between the annular flanges 250 and 252 and is disposed between the cylindrical radially outer surface 256 of the side wall 254 and the cylindrical inner side surface 190 of the opening 78 through the hub or base member 70.

The annular flange sections 250 and 252 also extend radially inward from the side wall 254. This results in the formation of an annular inner manifold chamber 262 between a cylindrical inner side surface 264 of the side wall 254 and a cylindrical outer side surface of the shaft 24. The inner manifold chamber 262 extends axially between the flange sections 250 and 252 and is coaxial with the outer manifold chamber 258.

A plurality of circular ports or openings 268 (FIGS. 8, and 11) are formed in the side wall 254. The openings 268 connect the inner manifold chamber 262 (FIG. 8) in fluid communication with the outer manifold chamber 258. The inner manifold chamber 262 is aligned with the radial port for the passage 38 in the shaft 24 (FIG. 1). The outer manifold chamber 258 is aligned with the passage 126 (FIG. 6) in the hub or base member 70. The axial extent of the outer manifold chamber 258 and inner manifold chamber 262 is such as to eliminate any need for precise alignment of the radial port for the passage 38 in the shaft 24 with the passage 126 in the hub or base member 70.

When the valve 36 (FIG. 1) is actuated to connect the passage 38 in the shaft 24 with the source of fluid (air) under pressure and engage the clutch-brake assembly 20, the air flows from the radial port in the shaft 24 into the inner manifold chamber 262 (FIG. 8) at a location between the flange section 250 and the flange section 252. This air is conducted around the periphery of the shaft 24 while the air is in the annular inner manifold chamber 262. The air flows through the openings 268 to the annular outer manifold chamber 258. The annular outer manifold chamber 258 extends around the outside of the cylindrical side wall 254 of the seal assembly 244. The outer manifold chamber 258 is connected in fluid communication with the passage 126 (FIG. 6) in the hub or base member 70. Therefore, the air can flow from the outer manifold chamber 258 through the passage 126 into the variable volume chamber 120.

The fluid pressure in the annular variable volume chamber 120 (FIG. 5) is applied against the annular piston 108. Therefore, the fluid pressure is effective to press the annular flange portion 144 of the piston 108 against the annular clutch disc 62. The clutch disc 62 is securely gripped between the flange portion 144 of the piston 108 and the flange 74 on the hub or base section 70.

Force (torque) is transmitted from the rotating flywheel 22 (FIG. 1) through the clutch disc 62 to the hub or base member 70 (FIG. 5). The force (torque) is transmitted from the hub or base member 70 through the connector assembly 180 to the shaft 24 to rotate the shaft. At this time, the body assembly 58 is freely rotatable relative to the stationary brake disc 60.

When the valve 36 (FIG. 1) is actuated to connect the passage 38 in the shaft 24 with atmosphere through the muffler 42 and disengage the clutch-brake assembly 20, air flows from the variable volume chamber 120 (FIGS. 5 and 6) through the passage 126 (FIG. 6) in the hub or base member 70. As this occurs, the springs 134 move the piston 108 axially away from the clutch disc 62 toward the brake disc 60. The springs 134 are effective to press the flange portion 144 of the piston 108 against the brake disc 60. The brake disc 60 is securely gripped between the flange portion 144 of the piston 108 and the cylinder or cover member 82.

This results in force (torque) being transmitted between the rotating shaft 24 and stationary member 30 through the brake disc 60. The force (torque) transmitted to the shaft 24 quickly interrupts rotation of the shaft and holds the shaft stationary. At this time, the clutch disc 62 and flywheel 22 are freely rotatable relative to the stationary body assembly 58.

Fluid (air) is forced from the chamber 120 through the passage 160 by leftward (as viewed in FIG. 6) movement of the piston 108 under the influence of the springs 134. This fluid is conducted to the outer manifold chamber 258 (FIG. 8). The air flows from the outer manifold chamber 258 through the openings 268 to the inner manifold chamber 262. The air is conducted from the inner manifold chamber 262 through the passage 38 in the shaft 24 (FIG. 1) to the atmosphere through the muffler 42.

The seal assembly 244 (FIG. 8) includes a plurality of seal elements which provide for sealing engagement of the body 248 of the seal assembly with the outer side surface of the shaft 24 and with the inner side surface 190 of the opening 78 through the hub or base member 70. The plurality of seal elements include annular outer seal rings 272 and 274 which are disposed in annular radially outwardly facing grooves 276 and 278 (FIGS. 8, 10 and 11) in the flange sections 250 and 252. The annular outer seal ring 272 (FIG. 8) is disposed in sealing engagement with the flange section 250 and with the cylindrical inner side surface 190 of the opening 78 extending through the hub or base member 70. Similarly, the outer seal ring 274 is disposed in sealing engagement with the flange section 252 and with the inner side surface 190 of the opening 78 extending through the hub or base member 70.

The plurality of seal elements in the seal assembly 244 (FIG. 8) also includes annular inner seal rings 282 and 284. The annular inner seal rings 282 and 284 are disposed in annular radially inwardly facing grooves 286 and 288 (FIGS. 8, and 11) formed in the flange sections 250 and 252. The annular inner seal rings 282 and 284 (FIG. 8) sealingly engage the cylindrical outer side surface of the shaft 24 at a location disposed on axially opposite sides of the location where the radial port connected with the passage 38 intersects the cylindrical outer side of the shaft 24.

Figure 10:
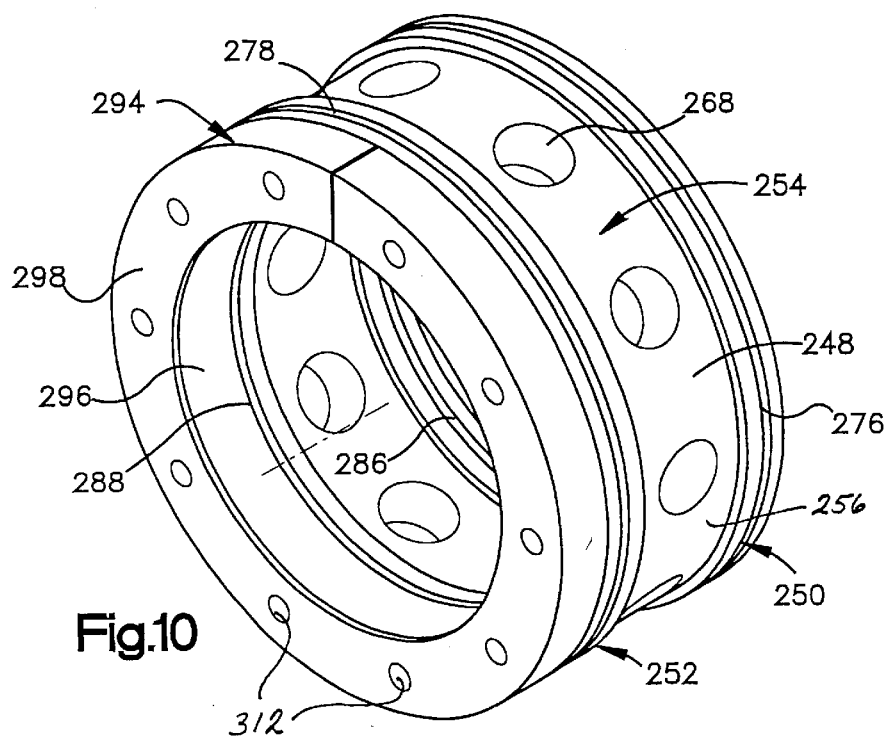
FIG. 10 is a pictorial illustration of a portion of the seal assembly of FIGS. 7–9.
Figure 11:
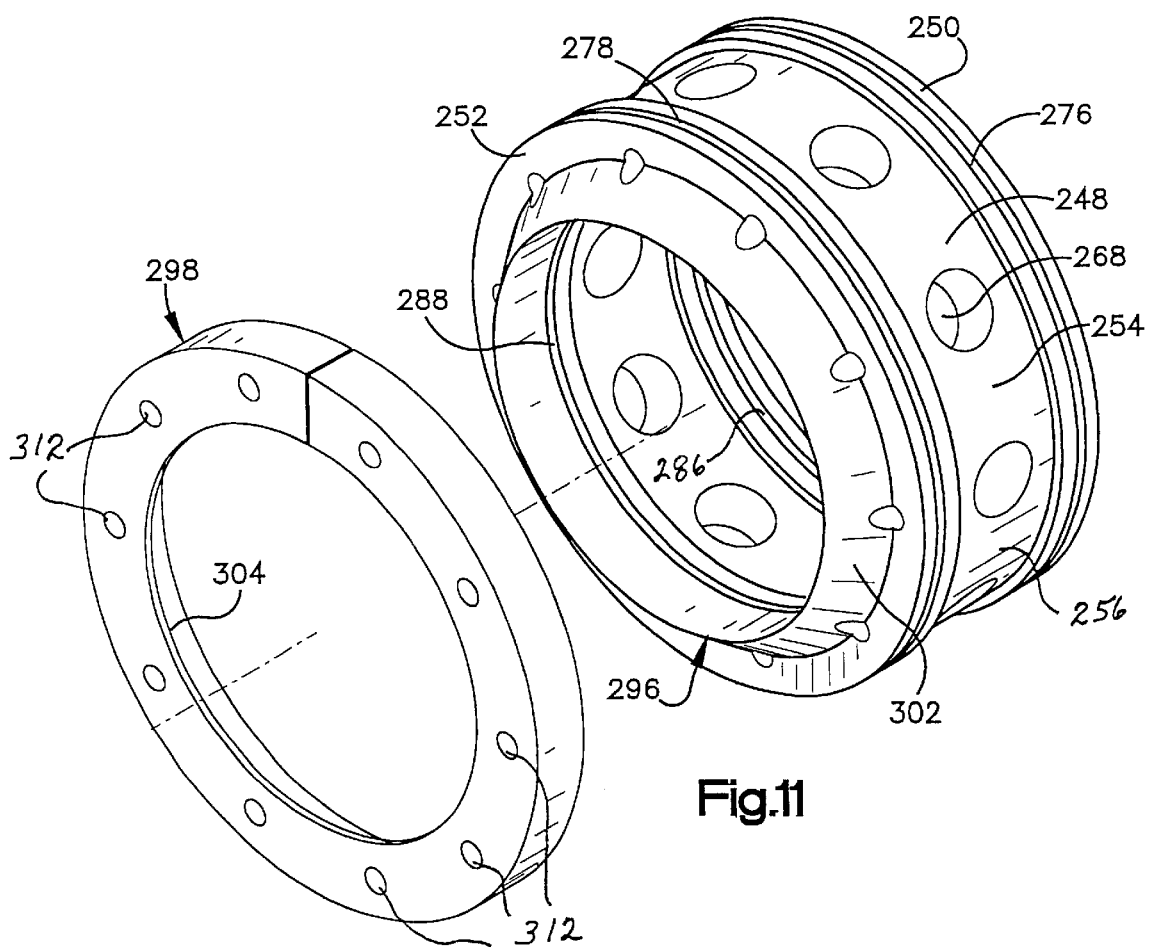
FIG. 11 is an exploded illustration of the portion of the seal assembly illustrated in FIG. 10 and illustrating the relationship between a main or retaining section of the seal assembly and an actuator or expansion ring which is utilized to press the retaining section into gripping engagement with the hub or base member and/or gripping engagement with the shaft of FIG. 1.

In accordance with one of the features of the invention, the seal assembly 244 securely grips the shaft 24 to maintain the seal assembly in a desired position along the axial extent of the shaft 24. To grip the cylindrical outer side surface of the shaft 24, the seal assembly includes a retainer assembly 294 (FIGS. 8 and 10). The retainer assembly 294 includes an annular metal retainer section or lip 296 (FIGS. 8, 10 and 11) which is integrally formed as one piece with and extends axially outward from the flange section 252 of the metal body 248.

An annular metal actuator ring 298 is disposed in engagement with the metal retainer section or lip 296. The annular actuator ring 298 is axially movable toward the flange section 252 to deflect the annular retainer section 296 radially inward into firm metal-to-metal engagement with the cylindrical outer side surface of the shaft 24. At the same time, the annular actuator ring 298 is deflected radially outward into firm metal-to-metal engagement with the inner surface 190 of the opening in the hub or base member 70.

To provide for this radially inward deflection of the retainer lip 296, the retainer lip is provided with an annular, radially outwardly facing, cam or wedge surface 302 (FIGS. 8 and 11) which engages a radially inwardly facing cam or wedge surface 304 on the actuator ring 298. The cam surfaces 302 and 304 are formed as portions of right circular cones having the same configuration. If desired, one or more slits may be provided in the retainer section 296 to facilitate deflection of the retainer lip by the actuator ring 298. One or more slits are provided in the actuator ring 298 to facilitate deflection of the actuator ring by the retainer section 296.

A plurality of bolts or actuator members 310 (FIGS. 7 and 8) extend through the body 298 into engagement with threaded openings 312 (FIGS. 10 and 11) in the actuator ring 298. Upon rotation of the bolts or actuator members 310, the actuator ring 298 is pulled toward the left (as viewed in FIG. 8). This leftward movement of the actuator ring 298 causes the cam surface 304 on the actuator ring to slide along the cam surface 302 on the retainer section 296. As this occurs, the retainer section 296 is deflected radially inward into firm abutting engagement with the outer side surface of the shaft 24. At the same time, the actuator ring 298 is deflected radially outward into firm abutting engagement with the inner side surface 190 of the opening 78 in the hub or base member 70.

The metal-to-metal engagement of the retainer section or lip 296 with the shaft 24 is effective to lock the seal assembly 244 against movement relative to the shaft. The metal-to-metal engagement of the actuator ring 298 with the hub or base member 70 is effective to lock the seal assembly against movement relative to the hub or base member. The connector assembly 180 (FIG. 5) locks the shaft 24 and body assembly 58 against relative movement. Therefore, the seal assembly 244 is securely locked against movement relative to both the shaft 24 and body assembly 58.

If desired, the seal assembly 244 could be deflected into firm abutting engagement with only the outer side surface of the shaft 24 or only the inner side surface 190 of the opening 78 in the hub or base member 70. For example, the actuator ring 298 could be a rigid ring which is free of slits and does not expand radially outward as the retainer section 296 expands radially inward against the outer surface of the shaft 24. Alternatively, the retainer section 296 could be a rigid ring which is free of slits and does not expand radially inward as the actuator ring 298 expands radially outward. However, it is believed that it will be preferred to expand the retainer section 296 radially inward to grip the shaft 24 and to expand the actuator ring 298 radially outward to grip the hub or base member 70.

Insertion and Removal of Seal Assembly and Connector Assembly

In accordance with one of the features of the present invention, the connector assembly 180 and seal assembly 244 may be oriented so as to be removable from and insertable into the clutch-brake assembly 20 at a selected one of the two ends of the central opening 78. When the clutch-brake assembly 20 is positioned relative to the flywheel 22 and shaft 24 in the manner illustrated schematically in FIG. 1, access to the interior of the clutch-brake assembly from the right (as viewed in FIGS. 1, 5 and 8) side of the clutch-brake assembly is blocked by the flywheel 22 and shaft 24. Therefore, the connector assembly 180 (FIG. 8) and seal assembly 244 must be sequentially inserted into and removed from the left end of the clutch-brake assembly 20.

When the clutch-brake assembly 20 is to be accessible only from the left (as viewed in FIGS. 1, 5 and 8) end of the clutch-brake assembly, the shaft 24 is positioned in the central opening 78 in the hub or base member 70 of the clutch-brake assembly from the right end of the opening. The flywheel 22 and stationary member 30 are connected with the clutch disc 62 and brake disc 60. When the shaft 24 is positioned in the opening 78, the connector assembly 180 and seal assembly 244 have not yet been positioned in the opening.

The connector assembly 180 is moved into the opening 78 through the opening 84 (FIG. 5) in the cylinder or cover member 82 and the left (as viewed in FIGS. 1, 5 and 8) end of the opening 78. At this time, the wedge members 182 and 184 are disposed in relatively loose engagement with the collar 186. Therefore, there is a small amount of radial clearance between the inside of the annular wedge members 182 and 184 and the cylindrical outside of the shaft 24. There is also a small amount of radial clearance between the outer side surface 188 of the collar 186 and the cylindrical inside of the opening 78 in the hub or base member 70. This enables the connector assembly 180 to be moved axially along the shaft 24 to the position illustrated in FIGS. 5 and 8 relative to the hub or base member 70.

Since the seal assembly 244 has not yet been installed in the opening 78, the head end portions of the bolts or actuator members 230 are accessible from the left end of the opening 78. Therefore, the bolts or actuator members 230 can be tightened. This pulls the wedge members 182 and 184 axially toward each other and toward the flange 228 disposed between the wedge members.

As the bolts or actuator members 230 are tightened, the wedge members 182 and 184 are moved radially inward into solid metal-to-metal contact with the outer side surface of the shaft 24. At the same time, the collar 186 is deflected radially outward into solid metal-to-metal engagement with the inner side surface of the opening 78 through the hub or base member 70. This results in the connector assembly 180 being securely locked against movement relative to both the shaft 24 and the hub or base member 70. This enables relatively large forces (torque) to be transmitted between the hub or base member 70 and the shaft 24 without relative movement between the hub or base member and the shaft.

Once the connector assembly 180 has been mounted in the central opening 78 in the hub or base member 70 and is effective to securely grip the shaft 24, the seal assembly 244 is moved into the central opening in the hub or base member. The seal assembly 244 is also moved into the central opening 78 through the opening 84 in the cylinder or cover member 82 and the left (as viewed in FIG. 8) end of the central opening. As the seal assembly 244 is moved into the central opening 78, the radially outer seal rings 272 and 274 sealingly engage the cylindrical inner side surface of the opening. At the same time, the radially inner seal rings 282 and 284 move into sealing engagement with the cylindrical outer side of the shaft 24. If desired, the seal assembly 244 may extend into the central opening 84 in the cylinder or cover member 82.

When the seal assembly 244 has been moved to the position illustrated in FIGS. 5, 7 and 8, the radial port which is connected with the passage 38 in the shaft 24, is disposed approximately midway between the inner seal rings 282 and 284. Similarly, the passage 126 (FIG. 6) in the hub or base member 70 is disposed approximately midway between the outer seal rings 272 and 274. This results in the passage 38 in the shaft 24 being connected in fluid communication with the passage 120 in the hub or base member 70. The passages 38 and 126 are connected in fluid communication with each other through the inner manifold chamber 262, the openings 268 in the side wall 254, and the outer manifold chamber 258.

The bolts or actuator members 310 are then tightened to securely lock the seal assembly in place on the shaft 24 and in the hub or base member 70. Access is obtained to the bolts or actuator members 310 at the left end of the central opening 78 in the hub or base member 70. Tightening the bolts 310 pulls the actuator ring 298 toward the left (as viewed in FIG. 8). This leftward movement of the actuator ring 298 deflects the retainer section or lip 296 into firm metal-to-metal engagement with the cylindrical outer side surface of the shaft 24 and deflects the actuator ring 298 into firm metal-to-metal engagement with the cylindrical inner surface 190 of the hub or base member 70.

Engagement of the retainer section or lip 296 with the outer side surface of the shaft 24 holds the seal assembly 244 against movement relative to the shaft. Engagement of the actuator ring 298 with the inner side surface 190 of the hub or base member 70 holds the seal assembly 244 against movement relative to the hub or base member. The connector assembly 180 holds the hub or base member 70 against movement relative to the shaft 24. Therefore, there is no relative movement between the seal assembly 244, the shaft 24, and the hub or base member 70.

As was previously mentioned, the seal assembly 244 could grip only the shaft 24 or only the hub or base member 70. Since the connector assembly 180 holds the hub or base member 70 against movement relative to the shaft 24, there would be no relative movement between the seal assembly 244 and either the shaft 24 and hub or base member 70 if the seal assembly was effective to grip only one of them.

It is contemplated that it may be desired to disconnect the clutch-brake assembly 20 from the shaft 24 for maintenance purposes. When this is to be done, access is again obtained to the bolts or actuator members 310 for the seal assembly 244 at the left (as viewed in FIG. 8) end of the opening 78 through the base or hub member 70. The bolts or actuator members 310 are loosened to cause the actuator ring to 298 to move toward the right (as viewed in FIG. 8). As this occurs, the grip of the retainer section or lip 296 on the shaft 24 is relaxed. At the same time, the grip of the actuator ring 298 on the hub or base member 70 is relaxed. The seal assembly 244 can then be pulled leftward (as viewed in FIG. 8) out of the central opening 78 in the hub or base member 70 and off of the left end of the shaft 24.

Once the seal assembly 244 has been removed from the central opening 78 in the hub or base member 70, access is obtained to the bolts or actuators 230 for the connector assembly 180. The bolts or actuators 230 are then actuated, that is, loosened. As this occurs, the wedge members 182 and 184 are moved axially apart, that is in a direction away from the central flange 228. This relaxes the grip of the wedge members on the shaft 24 and relaxes the grip of the collar 186 on the hub or base member 70. The wedge members may be loosened, that is, moved axially apart, in a manner similar to that disclosed in U.S. Pat. Nos. 3,957,381 or 4,025,213.

Once the wedge members 182 and 184 have been loosened, the connector assembly 180 can be moved through the left end (as viewed in FIG. 8) of the opening 78. Alternatively, the brake disc 60 could be disconnected from the stationary frame 30 and the clutch disc 62 could be disconnected from the flywheel 22 and the clutch-brake assembly moved leftward (as viewed in FIG. 1) off of the end of the shaft 24 with the connector assembly in the opening 78 in the hub or base member 70.

Alternative Orientation of Seal Assembly and Connector Assembly

Figure 9:
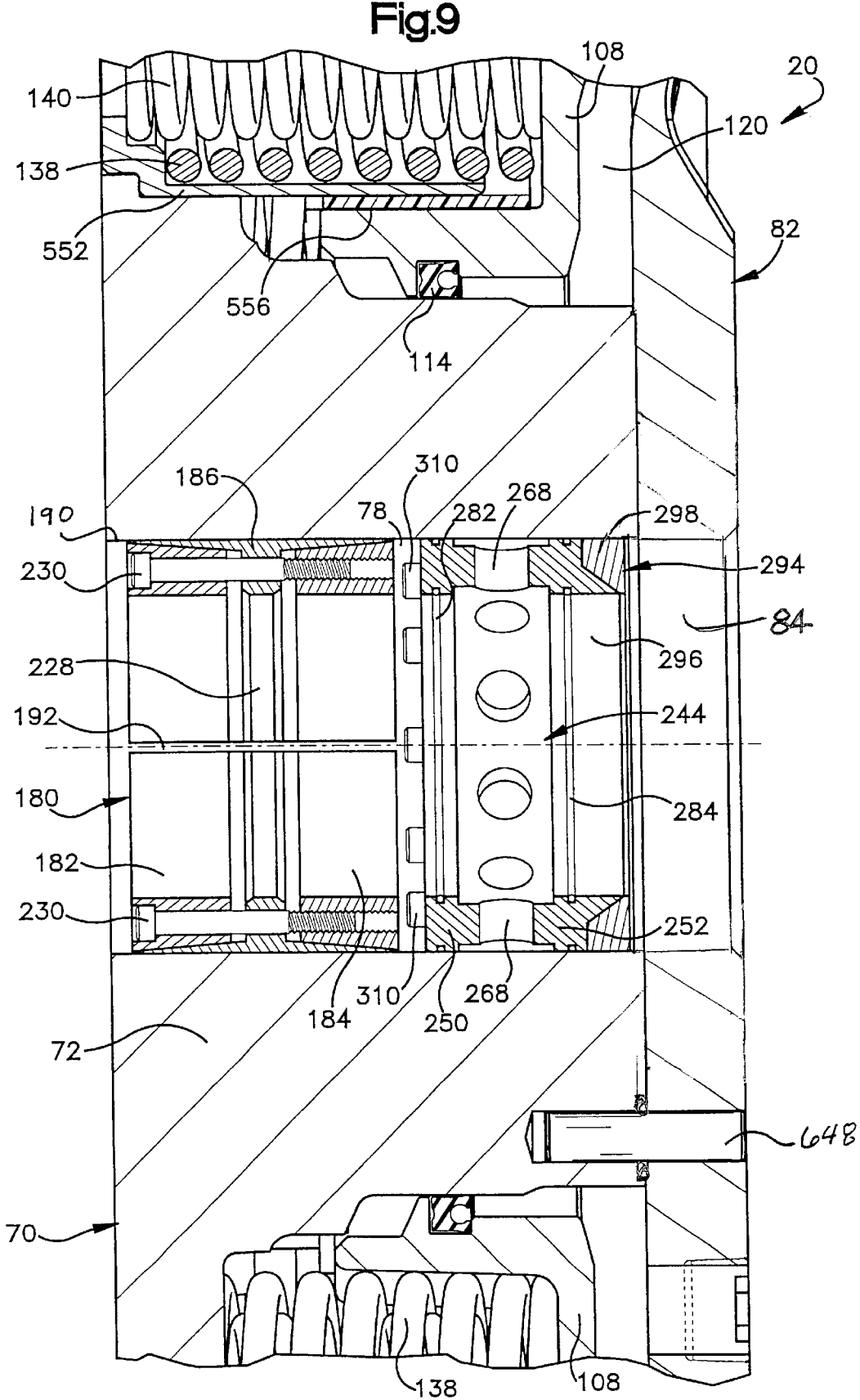
FIG. 9 is an enlarged sectional view, generally similar to FIG. 7, illustrating the relationship of the connector assembly and seal assembly to the hub or base member when the clutch-brake assembly is in the orientation illustrated schematically in FIG. 2.

The seal assembly 244 and connector assembly 180 have been illustrated in FIGS. 5, 7 and 8 in the orientations in which they would appear in the clutch-brake assembly 20 when access to the central opening 78 of the clutch-brake assembly is from the left. Thus, access to the central opening 78 is obtained through the opening 84 in the cylinder or cover member 82 when the seal assembly 244 and connector assembly 180 are in the orientation illustrated in FIGS. 5, 7 and 8. However, in accordance with one of the features of the present invention, the orientation of the connector assembly 180 and seal assembly 244 may be changed to accommodate access to the central opening 78 through the opposite end of the hub or base member 70 (FIG. 9).

When the clutch-brake assembly 20 is in the orientation shown in FIG. 2, access to the central opening 78 will be through the hub or base end 50 of the clutch-brake assembly 20. This is the end of the opening opposite from the cylinder or cover member 82. Thus, access to the central opening 78 will be through the left (as viewed in FIG. 9) end of the opening, that is, from the hub or base member 70 end of the clutch-brake assembly 20.

When access to the central opening 78 is through the end of the opening opposite from the cover or cylinder member 82, the seal assembly 244 is inserted into the central opening 78 prior to insertion of the connector assembly 180. The seal assembly 244 is moved into the left (as viewed in FIG. 9) end of the central opening 78 with the retainer assembly 294 leading. The seal assembly 244 is then positioned in the opening with the head end portions of the bolts or actuator members 310 facing toward the left, as viewed in FIG. 9.

By having the head ends of the bolts or actuator members 310 for the seal assembly 244 facing toward the left (as viewed in FIG. 9), the bolts are accessible from the left or hub end of the opening 78. The bolts or actuator members 310 are actuated (tightened) to cause the actuator ring 298 to move toward the left (as viewed in FIG. 9). This deflects the retainer section or lip 296 into engagement with the outer side surface of the shaft 24 in the manner previously explained in conjunction with FIGS. 7 and 8. Deflection of the retainer section 296 secures the seal assembly 244 against movement relative to the shaft 24. Operation of the bolts or actuator members 310 and movement of the actuator ring 298 also deflects the actuator ring 298 into engagement with the inner surface 190 of the opening 78 in the manner previously explained in conjunction with FIGS. 7 and 8. Deflection of the actuator ring 298 secures the seal assembly 244 against movement relative to the hub or base member 70.

The seal assembly 244 has been illustrated in FIG. 9 as being disposed only in the central opening 78 in the hub or base member 70. However, the seal assembly could extend into the opening 84 in the cylinder or cover member 82. If this was done, operation of the bolts or actuator members 310 would expand the actuator ring 298 radially outward into engagement with the inner surface of the central opening 84 in the cylinder or cover member 82.

The connector assembly 180 is then positioned in the central opening 78. The connector assembly 180 is moved into the left (as viewed in FIG. 9) end of the central opening 78 with the wedge member 184 leading. The head ends of the bolts or actuators 230 are accessible from the left (as viewed in FIG. 9) end of the opening 78.

The bolts or actuators 230 are rotated to move the wedge members 182 and 184 toward each other and toward the flange 228. As this occurs, the wedge members 182 and 184 move into firm gripping engagement with the exterior surface of the shaft 24. As the wedge members 182 and 184 move toward each other, the collar 186 is deflected radially outward to securely grip the inside of the opening 78. This results in the base or hub member 70 being fixedly connected with the shaft 24 in the same manner as was previously described herein in association with FIGS. 7 and 8.

The connector assembly 180 and seal assembly 244 are connected with the shaft 24 with the shaft extending toward the right (as viewed in FIG. 9) from the opening 78 in the hub or base member 70. The shaft 24 extends through the opening 84 in the cylinder or cover member 82. The radial port leading to the passage 38 in the shaft 24 is aligned with the seal assembly 244. In addition, the passage 126 (FIG. 6) in the hub or base member 70 is aligned with the seal assembly 244. Therefore, fluid communication is established between the passage 38 in the shaft 24 and the variable volume chamber 120 in the clutch-brake assembly 20.

Seal Assembly—Second Embodiment

In the seal assembly 244 of FIGS. 7, 8 and 9, annular seal rings 272, 274, 282, and 284 (FIG. 8) are disposed in grooves 276, 278, 286, and 288 (FIGS. 8, 10 and 11) in the body 248 of the seal assembly. The grooves 276, 278, 286 and 288 have a constant size so that the seal rings 272, 274, 282 and 284 must extend out of the grooves into sealing engagement with either the hub 70 or the shaft 24. Since the seal rings 272, 274, 282 and 284 project out of their associated grooves, the seal rings tend to interfere with positioning of the seal assembly 244 in the central opening 78 in the hub or base member 72. The seal rings 272, 274, 282 and 284 also tend to interfere with positioning of the seal assembly 244 relative to the shaft 24.

Figure 12:
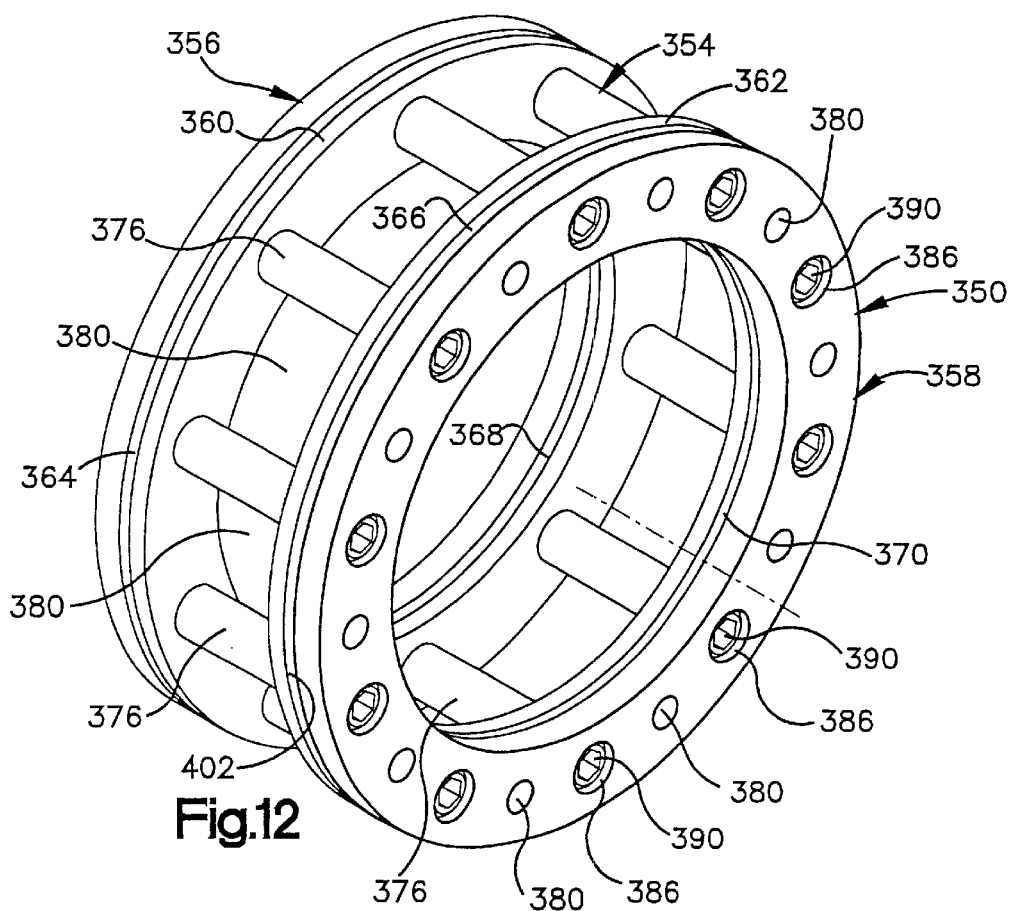
FIG. 12 is a pictorial illustration of a portion of a second embodiment of the seal assembly.
Figure 13:
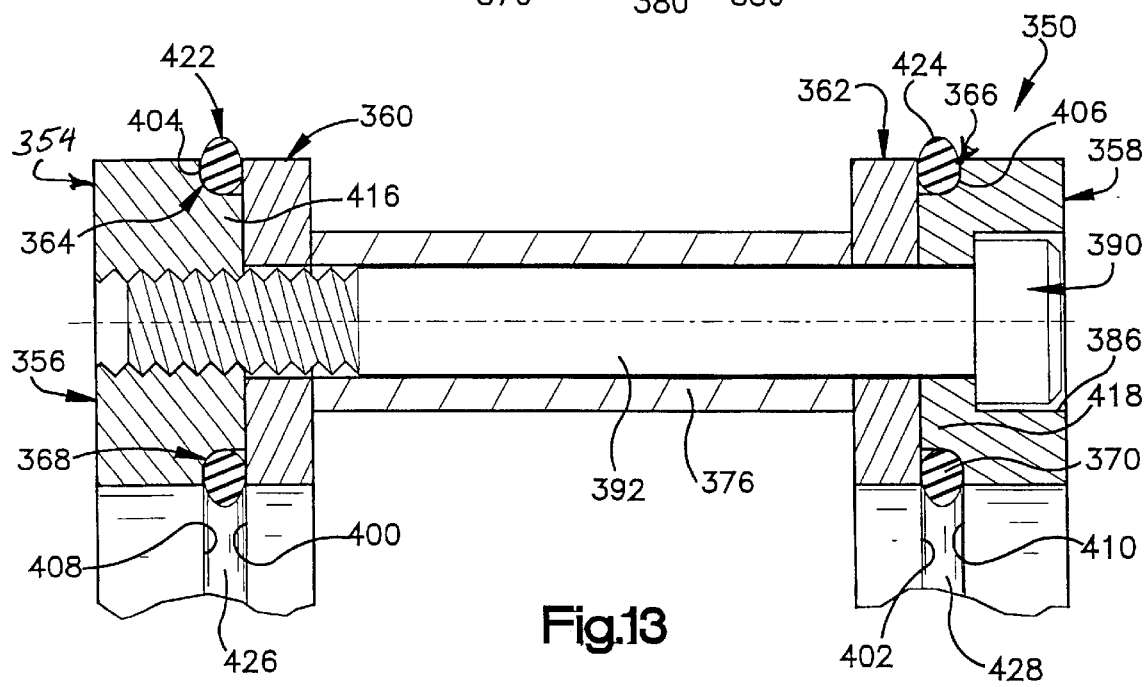
FIG. 13 is a fragmentary sectional view illustrating the relationship between a compression ring and a body portion of the seal assembly of FIG. 12.

In accordance with one of the features of the invention, the seal assembly illustrated in FIGS. 12 and 13 has variable size grooves which receive the seal rings. The seal ring grooves have a relatively large cross sectional size when the seal assembly is positioned relative to the shaft 24 and clutch-brake assembly 20. At this time, the seal rings project only small distances from their associated grooves and do not interfere with positioning of the seal assembly of FIG. 12 relative to the shaft 24 and clutch-brake assembly 20. Once the seal assembly of FIGS. 12 and 13 has been positioned relative to the shaft 24 and the clutch-brake assembly 20, the seal ring grooves are decreased in size to cause the seal rings to expand out of the grooves into sealing engagement with the shaft 24 and clutch-brake assembly 20.

A portion of a seal assembly 350 is illustrated in FIG. 12. The seal rings, corresponding to the seal rings 272, 274, 282, and 284 of FIG. 8 have been omitted from FIG. 12.

The seal assembly 350 includes a generally cylindrical metal body 354 which is coaxial with a pair of metal annular actuator rings or compression plates 356 and 358. The annular actuator rings 356 and 358 cooperate with a pair of annular metal end rings 360 and 362 on the body 354 to form a pair of annular variable size outer seal ring grooves 364 and 366 (FIGS. 12 and 13). The actuator rings 356 and 358 also cooperate with the end rings 360 and 362 to form a pair of annular variable size inner seal ring grooves 368 and 370.

Annular outer seal rings 422 and 424, corresponding to the seal rings 272 and 274 of FIG. 8, are received in the outer seal ring grooves 364 and 366. Similarly, annular inner seal rings 426 and 428, corresponding to the inner seal rings 282 and 284 of FIG. 8, are received in the inner seal ring grooves 368 and 370. The annular outer seal rings 422 and 424 (FIG. 13) are disposed in a coaxial relationship with the body 354 and seal ring grooves 364 and 366. The annular inner seal rings 426 and 428 are disposed in a coaxial relationship with the body 354 and seal ring grooves 368 and 370. The seal rings 272, 274, 282 and 284 are formed of a resilient polymeric material.

The metal body 354 of the seal assembly 350 (FIG. 12) includes a plurality of tubular metal spacer members 376. The spacer members 376 are hollow cylindrical metal tubes which are fixedly connected to flat radially extending annular end surfaces on the end rings 360 and 362. Openings 380 are formed between the spacer members 376. The openings 380 correspond to the openings 268 of the seal assembly 244 illustrated in FIG. 8. Thus, fluid flows between the passage 38 in the shaft 24 (FIG. 1) and the passage 126 (FIG. 6) in the clutch-brake assembly 20 through the openings 380 in the same manner as previously explained in conjunction with the openings 268 in the seal assembly 244 of FIG. 8.

The annular metal actuator rings 356 and 358 have the same construction. The actuator rings 356 and 358 are interconnected by bolts or actuator members 390. The metal bolts or actuator members 390 extend from relatively large countersunk openings in one of the actuator rings 356 or 358, through the tubular spacer members 376 (FIG. 13) and end rings 360 and 362 into threaded openings in the other actuator ring. Relatively large openings 386 in the actuator ring 358 are aligned with the spacer members 376 (see FIGS. 12 and 13). Head end portions of the bolts or actuator members 390 are disposed in the countersunk openings 386 in the actuator ring 358. Shank or main portions 392 (FIG. 13) of the bolts 390 extend through the end ring 362 of the body 354, through the spacer members 376, through the opposite end ring 360, and into threaded openings 380 in the actuator ring 356.

The outer seal ring grooves 364 and 366 and the inner seal ring grooves 368 and 370 are formed between flat annular side surfaces 400 and 402 (FIG. 13) on the end rings 360 and 362 and tapered or curved annular side surfaces 404, 406, 408, and 410 on the actuator rings 356 and 358. The annular side surfaces 404 and 408 on the actuator ring 356 (FIG. 13) are disposed in a coaxial relationship. Similarly, the annular side surfaces 406 and 410 on the actuator ring 358 are disposed in a coaxial relationship.

The side surfaces 404, 406, 408 and 410 on the actuator rings 356 and 358 have accurately curving cross sectional configurations and slope toward annular nose portions 416 and 418 on the actuator rings 356 and 358. The side surfaces 404, 406, 408 and 410 on the actuator rings 356 and 358 cooperate with the flat side surfaces 400 and 402 on the end rings 360 and 362 to form the annular seal ring grooves 364, 366, 368 and 370 (FIG. 13). Annular outer seal rings 422 and 424 are disposed in the outer seal ring grooves 364 and 366. Similarly, annular inner seal rings 426 and 428 are disposed in the inner seal ring grooves 368 and 370.

Prior to tightening of the bolts or actuator members 390, the nose portions 416 and 418 on the actuator rings 356 and 358 are spaced from the end rings 360 and 362. At this time, the seal ring grooves 364, 366, 368 and 370 have a relatively large cross sectional size and hold the seal rings 422, 424, 426 and 428 without significant deformation of the seal rings. The seal rings 422, 424, 426 and 428 have circular cross sectional configurations and are almost entirely contained within the grooves 364, 366, 368 and 370. This enables the seal assembly 350 to be readily positioned relative to the shaft 24 and the clutch-brake assembly 20.

The seal assembly 350 is positioned in the same relationship relative to the clutch-brake assembly 20 as is illustrated in FIGS. 7 and 8 for the seal assembly 244. The seal assembly 350 may be positioned entirely within the central opening 78 in the hub or base member 70. Alternatively, a portion of the seal assembly 350 could extend from the central opening 78 in the hub or base member 70 into central opening 84 in the cylinder or cover member 82. When the seal assembly 350 is in either of these positions, the radial port in the shaft 24 connected with the passage 38 is disposed between the end rings 360 and 362 (FIG. 12) on the body 354 of the seal assembly 350.

Once the seal assembly 350 has been positioned relative to the shaft 24 and clutch-brake assembly 20, the bolts or actuator members 390 are tightened to decrease the size of the seal ring grooves 364, 366, 368 and 370. As the seal ring grooves 364, 366, 368 and 370 are decreased in size, the outer seal rings 422 and 424 are expanded radially outward into sealing engagement with the inner side surface 190 of the central opening 78 in the hub or base member 70 in the clutch-brake assembly 20. The inner seal rings 426 and 428 are expanded radially inward into sealing engagement with the outer side surface of the shaft 24. The seal rings 422, 424, 426 and 428 are radially deformed from a circular cross sectional configuration to the irregular cross section between the seal ring groups 364, 366, 368, 370 and the mating sealing surfaces of the hub or base member 70 and the shaft 24.

Tightening movement of the bolt or actuator members 390 is limited by engagement of the nose portions 416 and 418 on the actuator rings 356 and 358 with the end rings 360 and 362 on the body 354 of the seal assembly 350. The head end portions of the bolts or actuator members 390 face toward the exposed end of the central opening 78 (FIG. 7). Thus, in FIG. 7, the head end portions of the bolts 390 would be disposed at the left (as viewed in FIG. 7) end of the seal assembly 350.

Since the actuator rings 356 and 358 have the same construction, the head end portions of the bolts or actuator members 390 can be positioned adjacent to either the end ring 360 or the end ring 362 (FIG. 12) of the seal assembly 350. To do this, it is merely necessary to index the actuator ring 356 to align the relatively large openings 386 in the actuator ring 356 with the spacer members 376 and to align the relatively small diameter openings 380 with the spacer members 376.

Seal Assembly—Third Embodiment

The seal assembly 350 of FIGS. 12 and 13 is relatively easy to position relative to the central opening 78 (FIG. 7) in the clutch-brake assembly 20 and relative to the shaft 24. This is because, prior to tightening of the bolt or actuator members 390, the annular seal rings 422, 424, 426 and 428 do not project for significant radial distances out of their associated grooves. However, the seal assembly 350 of FIGS. 12 and 13 does not have a retainer assembly, corresponding to the retainer assembly 294 (FIG. 8) for the seal assembly 244. Thus, the seal assembly 350 relies on tight frictional engagement between the seal rings 422, 424, 426 and 428 and the clutch-brake assembly 20 and shaft 24 to maintain the position of the seal assembly relative to the shaft.

Figure 14:
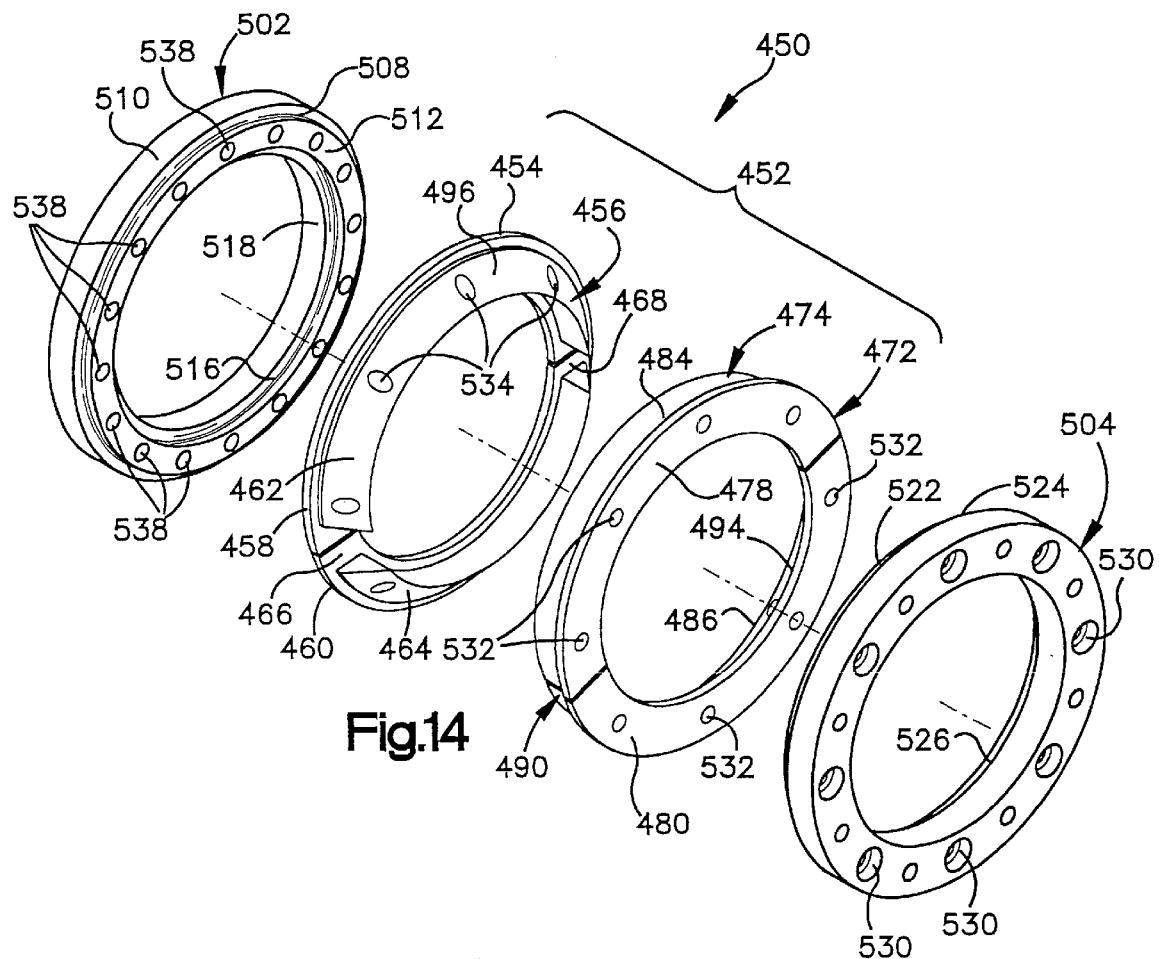
FIG. 14 is a schematic exploded illustration of a portion of a third embodiment of the seal assembly.

In accordance with one of the features of the embodiment of the seal assembly illustrated in FIG. 14, the seal assembly is provided with variable size annular seal ring grooves which can be decreased in size to effect expansion of the seal rings into sealing engagement with the clutch-brake unit 20 and with the shaft 24. In addition, the seal assembly of FIG. 14 is provided with a retainer assembly which grips the shaft 24 and the clutch-brake assembly 20 to hold the seal assembly in position relative to the shaft and the clutch-brake assembly.

The seal assembly 450 (FIG. 14) includes an annular metal retainer assembly 452 which forms the body of the seal assembly. The retainer assembly 452 includes a first or left annular metal base ring 454 on which a first or left annular metal retainer section or lip 456 is disposed. In the embodiment illustrated in FIG. 14, the first base ring 454 is formed as two sections, that is, an upper (as viewed in FIG. 14) section 458 and a lower section 460. Similarly, the first retainer section or lip 456 is formed as two pieces, that is, an upper (as viewed in FIG. 14) section 462 and a lower section 464.

It should be understood that the first retainer section or lip 456 could be formed so as to have more than the two sections illustrated in FIG. 14. For example, the first retainer section or lip 456 could be formed in four sections with two sections on each of the sections 458 and 460 of the first base ring 454. It should also be understood that the base ring 454 could be formed as one piece.

The upper section 462 of the first retainer section or lip 456 is integrally formed as one piece with the upper section 458 of the first base ring 454. Similarly, the lower section 464 of the first retainer section or lip 456 is integrally formed as one piece with the lower section 460 of the first base ring 454. When the upper section 458 and lower section 460 of the first base ring 454 are positioned adjacent to each other in the orientation shown in FIG. 14 for installation into a clutch-brake assembly, there are gaps or spaces 466 and 468 between the upper section 462 and lower section 464 of the first retainer section 456. The gaps or spaces 468 enable fluid to be conducted in a radial direction relative to the first base ring 454. If the first retainer section or lip 456 is formed with more than the two sections illustrated in FIG. 14, a greater number of gaps would be provided to accommodate fluid flow. The second base assembly 452 also includes a second or right annular metal base ring 472 and a second or right annular metal retainer section or lip 474.

The actuator ring 472 includes an upper section 478 and a lower section 480. In addition, the second retainer section 474 includes an upper section 484 and a lower section 486. The upper and lower sections 484 and 486 of the second retainer section 474 are spaced apart to form gaps 490 corresponding to and aligned with the gaps 466 and 468 between the upper and lower retainer sections 462 and 464. The number of gaps 490 in the second retainer section 474 corresponds to the number of gaps 466 and 468 in the first retainer section 456. Thus, the first retainer section 456 could be constructed with four gaps and the second retainer section 474 could be constructed with four gaps.

The second retainer section 474 has an axially tapering inner side or cam surface 494 which engages an axially tapering outer side surface 496 on the first retainer section 456. The interaction between the axially tapering surfaces 494 and 496 is effective to deflect the first retainer section or lip 456 radially inward into tight metal-to-metal engagement with the outer side surface of the shaft 24. The gaps 466 and 468 between the upper and lower retainer sections 462 and 464 are aligned with the gaps 490 between the upper and lower actuator sections 484 and 486. The aligned gaps provide a passage which enables fluid to flow from the radial port for the passage 38 in the shaft 24 (FIG. 1) to the passage 126 (FIG. 6) in the hub or base member 70.

The interaction between the axially tapering surfaces 494 and 496 is effective to deflect the second retainer section or lip 474 radially outward into tight metal-to-metal engagement with the inner side surface 190 of the hub or base member 70. Since the retainer assembly 452 engages both the shaft 24 and the hub or base member 70, the retainer assembly is effective to retain the seal assembly in a desired position relative to both the shaft 24 and clutch-brake assembly 20.

If desired, the first retainer section or lip 456 on the first base ring 454 could be provided with sufficient rigidity to prevent deflection of the first retainer section by the second retainer section 474 on the second base ring 472. Similarly, the second retainer section or lip 474 on the second base ring 472 could be provided with sufficient rigidity to prevent deflection of the second retainer section by the first retainer section 456. This would result in engagement of the second base ring 472 with the first base ring 454 without deflecting the retainer section into metal-to-metal engagement with the shaft 24 or other clutch-brake assembly 20. However, the gaps 466 and 468 between the upper section 462 and lower section 464 would still be aligned with the gaps 490 between the upper section 484 and the lower section 486 to accommodate fluid flow between the inside and the outside of the retainer assembly 452.

The first base ring 454 and the second base ring 472 have a diameter which is greater than the diameter of the first retainer section 456 and the second retainer section 474. Therefore, an annular manifold passage is provided around the seal assembly 450 between the outer side surface of the second retainer section 474 and the inner side surface of the central opening 78 through the hub or base member 70. In addition, an annular manifold chamber is provided between the inner side surface of the first retainer section 456 and the periphery of the shaft 24 to accommodate a flow of fluid around the shaft 24.

A pair of annular metal actuator rings 502 and 504 are provided at axially opposite ends of the seal assembly 458. The actuator rings 502 and 504 have the same construction as the actuator rings 356 and 358 of FIGS. 12 and 13. The actuator ring 502 (FIG. 14) cooperates with flat side surfaces on the upper and lower sections 458 and 460 of the first base ring 454 to provide a pair of annular grooves in which inner and outer seal rings, corresponding to the seal rings 422 and 426 of FIG. 13, are received.

To provide for the formation of the annular outer seal ring groove, the actuator ring 502 has an annular side surface with an accurately curving radial cross sectional configuration. The annular side surface 508 extends radially inward from a relatively large diameter cylindrical side surface 510 on the actuator ring 508 to an annular nose portion 512. Similarly, an annular side surface 516 on the actuator ring 502 has an arcuate radial cross sectional configuration. The side surface 516 slopes radially outward from a cylindrical inner side surface 518 on the actuator ring 502 to the nose portion 512. The inner side surface 518 is coaxial with the outer side surface 510 of the actuator ring 502.

The actuator ring 504 has the same construction as the actuator ring 502. Thus, the actuator ring 504 has a nose portion 522 and axially tapering annular side surfaces 524 and 526. The side surfaces 524 and 526 on the actuator ring 504 cooperate with flat side surfaces on the upper and lower sections 478 and 480 of the second base ring 472 to form inner and outer grooves which receive inner and outer seal rings, corresponding to the inner and outer seal rings 428 and 424 of FIG. 13.

Suitable bolts or actuator members, corresponding to the bolts 390 of FIGS. 12 and 13, extend through openings in the actuator ring 504, the second base ring 472, the first base ring 454, and the actuator ring 502 (FIG. 14). The head end portions of the bolts or actuator members are received in relatively large diameter openings 530 in the actuator ring 504 in the same manner as in which the head end portions of the bolts or actuator members 390 are received in relatively large diameter openings 386 in the actuator ring 358 of FIGS. 12 and 13. The bolts extend through unthreaded openings 532 (FIG. 14) in the second base ring 472 and through openings 534 in the first base ring 454. Threaded end portions of the bolts extend into relatively small diameter threaded openings 538 in the actuator ring 502 in the same manner as in which the bolts 390 of FIG. 13 extend into threaded openings in the actuator ring 356 of FIG. 13.

When the seal assembly 450 is to be installed in association with the shaft 24 and clutch-brake assembly 20, outer seal rings, corresponding to the outer seal rings 422 and 424 of FIG. 13 and inner seal rings, corresponding to the inner seal rings 426 and 428 of FIG. 13, are positioned in the seal ring grooves formed between the actuator ring 502 and the first base ring 454 and between the actuator ring 504 and the second base ring 472. At this time, the bolts or actuator members which extend between the actuator rings 502 and 504 are not drawn up tight and the nose portions 512 and 522 of the actuator rings 502 and 504 are spaced from the second ring 472 and the first base ring 454. Therefore, the seal ring grooves are relatively large in cross sectional size.

Once the seal assembly 450 has been moved to the desired position relative to the shaft 24 and the clutch-brake assembly 20, the bolts or actuator members are tightened. This results in radially outward expansion of the outer seal rings and radial inward expansion of the inner seal rings. The outer seal rings move into tight sealing engagement with the inner side surface of the opening 78 through the hub or base member 70 while the inner seal rings move into tight sealing engagement with the shaft 24. The nose portions 512 and 522 on the actuator rings 502 and 504 engage the base ring 454 and actuator ring 472 to limit the extent of compression of the seal rings.

Force Transmission Members

During operation of the clutch-brake assembly 20, force (torque) is transmitted between the piston 108 and the hub or base member 70 (FIG. 5). For example, when the clutch-brake assembly 20 is effective to hold the shaft 24 against rotation, the springs 134 urge the piston 108 toward the cylinder or cover member 82 to grip the brake disc 60. The brake disc 60 is held against rotation by the stationary member or frame 30.

Figure 16:
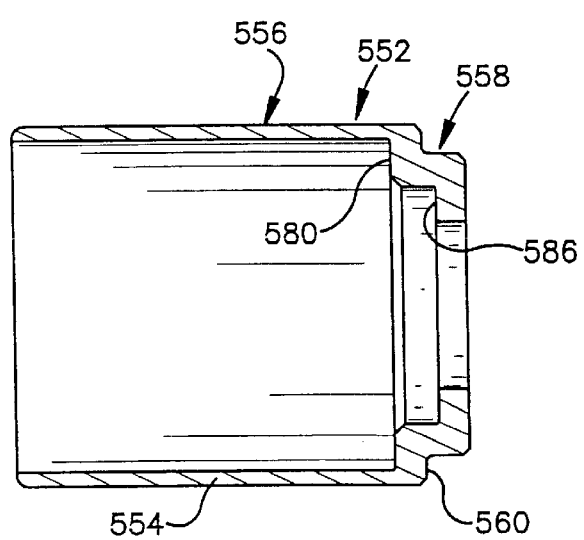
FIG. 16 (on sheet 9 of the drawings) is a sectional view, on a reduced scale, of the force transmitting member of FIG. 15.

Relative rotation between the piston 108 and the hub or base member 70 of the clutch-brake assembly 20 is blocked by a plurality of identical force transmission members 552 (FIGS. 5, 15 and 16). The metal force transmission members 552 interconnect the metal piston 108 and the metal hub or base member 70 to block relative rotation between the piston and the hub or base member. Since the metal cylinder or cover member 82 is fixedly connected to the hub or base member 70, the force transmission members 552 are effective to block relative rotation between the piston 108 and the cylinder or cover member 82.

The force transmission members 552 are fixedly connected to the hub or base member 70. The piston 108 is axially movable relative to the force transmission members 552. Axial movement of the piston 108 relative to the force transmission members 552 enables the piston to apply axial force against either the brake disc 60 or the clutch disc 62. It is contemplated that the force transmission members could be fixedly connected to the piston 108 and movable relative to the hub or base member 70 if desired.

The illustrated force transmission member 552 has a tubular construction (FIG. 16). Thus, the force transmission member 552 includes a circular side wall 554. The circular side wall 554 has a cylindrical main section 556 and an annular mounting section 558. The main section 556 and mounting section 558 of the force transmission member 552 are integrally formed from a single piece of metal. The mounting section 558 has an annular cross sectional configuration throughout its axial extent and is disposed in a coaxial relationship with the main section 556. The mounting section 558 extends radially inward from the main section 556.

The mounting section 558 has an annular locating shoulder 560 which is coaxial with the main section 556 of the force transmission member 552. The annular locating shoulder 560 engages an annular positioning flange 562 (FIG. 15) formed on the hub or base member 70. The locating shoulder 560 engages the positioning flange 562 to locate the force transmission member 552 axially relative to the hub or base member 70.

The cylindrical main section 556 of the tubular force transmitting member 552 has an interference fit with a cylindrical surface of a recess 564 (FIG. 15) in the hub or base member 70. The interference fit between the cylindrical main section 556 of the tubular force transmitting member 552 and the recess 564 fixedly connects the tubular force transmitting member to the hub or base member 70. However, the tubular force transmitting member 552 could be fixedly connected to the hub or base member 70 in a different manner if desired. The force transmitting member 552 could be fixedly connected to the piston 108 and be movable relative to the hub or base member 70 if desired.

The cylindrical main section 556 of the tubular force transmission member 552 extends axially into a cylindrical recess or opening 554 (FIG. 15) formed in the piston 108. Although only a single recess or opening 554 in the piston 108 and only a single force transmission member 552 have been illustrated in FIG. 15, it should be understood that there are a plurality of recesses or openings, having the same configuration as the recess or opening 554, in the piston 108. There are a plurality of force transmission members 552 extending into the openings or recesses 554 in the piston 108. Each of the force transmission members is received in a circular, generally cylindrical recess or opening 559 in the hub or base member 70.

In the specific embodiment of the invention illustrated in FIGS. 1–16, there are three force transmission members 552. Each of the three force transmission members 552 extends between a recess 554 in the piston 108 and a recess 558 in the hub or base member 70. The three force transmission members 552 are spaced one hundred and twenty degrees apart in an annular array. It should be understood that a greater or lesser number of force transmission members 552 could be provided if desired.

In accordance with one of the features of the invention, a cylindrical bearing or sleeve 566 (FIG. 15) is provided in the recess 554 in the piston 108 and extends around the portion of the force transmission member 552 which extends into the recess 554 in the piston 108. The bearing or sleeve 566 is fixedly secured to an inner side surface of the recess or opening 554 in the piston 108 by an interference fit and the use of adhesive materials between the bearing sleeve and the piston. Although only a single bearing or sleeve 566 is shown in FIG. 15, it should be understood that there is a bearing or sleeve around each of the force transmission members 552.

The bearing or sleeve 566 has a smooth cylindrical inner side surface 570 which engages a cylindrical outer side surface 572 on the force transmission member 552. There is smooth sliding engagement of the outer side surface of the force transmission member 552 with the inner side surface 570 of the bearing sleeve 566 (FIG. 15). This minimizes resistance to relative movement between the piston 108 and the hub or base member 70. The bearing or sleeve 566 can be utilized for many cycles of operation of the clutch-brake assembly without substantial wear. The inner side surface 570 of the bearing or sleeve 566 has a static coefficient of friction of 0.12 or less in order to minimize sliding friction between the force transmission member 552 and the bearing or sleeve 566.

In addition to minimizing wear between moving components of the clutch-brake assembly 20, the bearing or sleeve 566 is effective to absorb vibrations. When the clutch-brake assembly 20 is being utilized in association with a machine, such as a metal stamping press, the clutch-brake assembly is repeatedly operated between the engaged condition in which the clutch disc 62 is transmitting force (torque) from the flywheel 22 to drive the clutch-brake shaft assembly and the disengaged condition in which the brake disc 60 is transmitting force (torque) between the stationary member 30 and the clutch-brake assembly to hold the clutch-brake assembly and the shaft 24 against rotation. This repeated cycling of the clutch-brake assembly 20 tends to induce substantial vibrations in components of the clutch-brake assembly with resulting mechanical impact/vibration damage. The bearing or sleeve 566 is effective to reduce the amount of vibration and resultant mechanical impact/vibration damage generated during cyclic operation of the clutch-brake assembly 20.

To enable the bearing sleeve 566 to reduce vibration and noise, the bearing sleeve is formed of a material having a greater resilience than the piston 108, force transmission member 552, or the hub or base member 70. In one specific embodiment of the invention, the piston 108 and hub or base member 70 were formed of a ductile cast iron. The force transmission member 552 was formed of steel. In this particular embodiment of the clutch-brake assembly, the bearing of sleeve 566 was formed of a resilient polymeric material.

The polymeric material forming the bearing or sleeve 566 has a modulus of elasticity which is less than the modulus of elasticity of the piston 108 and hub or base member 70. The polymeric material forming the bearing or sleeve 566 has a modulus of elasticity which is less than the modulus of elasticity of the torque transmission member 552. The resilient nature of the material of the bearing or sleeve 566 enables the bearing or sleeve to attenuate the transmission of destructive mechanical vibrations generated during operation of the clutch-brake assembly. Although it is presently preferred to form the bearing or sleeve 566 of a polymeric material, it is contemplated that the bearing or sleeve 566 could be formed of a different material if desired.

It is contemplated that the bearing or sleeve 566 may be formed of many different materials having a resilience greater than the resilience of the ductile iron castings forming the piston 108 and hub or base member 70. It is also contemplated that the bearing or sleeve 566 will have a resilience greater than the resilience of the steel force transmission member 552. It is believed that it may be desired to form the bearing or sleeve 566 of a polymeric material, such as an epoxy resin with an inner liner of tetrafluoroethylene fluorocarbon polymer, that is, "TEFLON" (trademark).

The modulus of elasticity of the ductile iron castings forming the piston 108 and hub or base member 70 is approximately 25,000,000 pounds per square inch. The modulus of elasticity of the steel force transmission member is approximately 30,000,000 pounds per square inch. It is believed that it will be desired to form the bearing or sleeve 566 of a material having a modulus of elasticity of 16,000,000 pounds per square inch or less. More specifically, it is believed that it may be desired to form the bearing or sleeve 566 of a resilient polymeric material having a modulus of elasticity of 4,000,000 pounds per square inch or less.

One specific embodiment of the bearing or sleeve 566 had a radial thickness of approximately 0.125 inches. The thickness of the bearing or sleeve 566 is, to some extent, controlled by the amount of space available in the clutch-brake assembly 20. If a greater amount of space is available in the clutch-brake assembly, it is contemplated that the bearing or sleeve 566 could have a radial thickness of 0.500 inches or less. It is believed that if the radial thickness of the bearing or sleeve 566 is less than 0.0625 inches, the ability of the bearing or sleeve to attenuate vibration and noise will be reduced.

In the one specific embodiment referred to in the preceding paragraph, the bearing or sleeve 566 was formed of filament-wound fiberglass chemically bonded with epoxy with a Teflon liner. In this particular instance, the bearing or sleeve was obtained from Polygon Company having a place of business at 103 Industrial Park Drive, Walkerton, Ind. 46574.

In the embodiment of the clutch-brake assembly 20 illustrated in FIG. 15, the bearing or sleeve 566 is fixedly connected with the piston 108. Therefore, the bearing or sleeve 566 moves with the piston relative to the force transmission member 552. However, it is contemplated that the bearing or sleeve 566 could be fixedly connected to a force transmission member 552 and the piston 108 moved relative to both the bearing or sleeve 566 and the force transmission member 552.

It is desirable for the force transmission member 552 to have a relatively large diameter so as to maximize the available surface area for the transmission of force between the piston 108 and the force transmission member 552. Thus, if the force transmission member 552 has a relatively small diameter, the force transmitted between the piston 108 and the force transmission member 552 will be applied over a relatively small area. This will concentrate stresses and promote wear between relatively moving components of the clutch-brake assembly.

During cycling of the clutch-brake assembly 20, forces are transmitted between the force transmission member 552 and the hub or base member 70 at the mounting section 558 of the torque transmission member 552 and at a portion of the main section 556 of the circular side wall 554 of the force transmission member 552. The relatively large area of engagement between the force transmission member 552 and the hub or base member 70 minimizes stress concentrations and any tendency for the force transmission member 552 to move relative to the hub or base member 70. Also, spring forces from the plurality of springs 134 installed interior to force transmission member 552, reacting on surfaces 580 and 586, applies a net force on said surfaces that further ensures that transmission member 552 does not move relative to the hub or base member 70.

Compact construction of the clutch-brake assembly 20 is promoted by having an outer spring 138 and an inner spring 140 of the plurality of springs 134 at least partially disposed within the force transmission member 552. Thus, the relatively large diameter outer spring 138 has a right (as viewed in FIG. 15) end portion which abuts an annular shoulder 580 formed between the mounting section 558 and the cylindrical main section 556 of the force transmission member 552. The opposite or left (as viewed in FIG. 15) end of the outer spring 138 extends from the force transmission member 552 into engagement with a circular inner surface 584 of the recess 554 in the piston 108.

Compact construction of the clutch-brake assembly 20 is also promoted by having an inner spring 140 enclosed by both the outer spring 138 and the force transmission member 552. The right (as viewed in FIG. 15) end of the inner spring 140 engages a ledge or rim surface 586 formed on the mounting section 558 of the force transmission member 552. The opposite or left (as viewed in FIG. 15) of the inner spring 134 engages the end surface 584 of the recess 554 in the piston 108. By mounting the springs 138 and 140 within the force transmission member 552, the force transmission member can be provided with a relatively large outer side surface area to minimize stress concentrations with minimal waste space in the clutch-brake assembly 20. By providing the force transmission member 552 with a relatively large diameter, stress concentrations in both the piston 108 and hub member 70 during cyclical operation of the clutch-brake assembly tend to be minimized.

Although it is preferred to form the force transmission member 552 with a tubular construction in order to maximize the area of the outer surface 572 of the force transmission member, the force transmission member could have a solid construction if desired. For example, the force transmission member 552 could be formed as a relatively small diameter solid rod. The size of the bearing or sleeve 566 would be reduced to correspond to the relatively small diameter of the rod forming the force transmission member 552. Even though the size of the force transmission member 552 and the bearing or sleeve 566 are reduced, it is believed that the use of the bearing or sleeve will reduce friction between components of the clutch-brake assembly and reduce vibration and resultant impact/vibration damage.

Assembly of the Clutch-Brake Assembly

Figure 17:
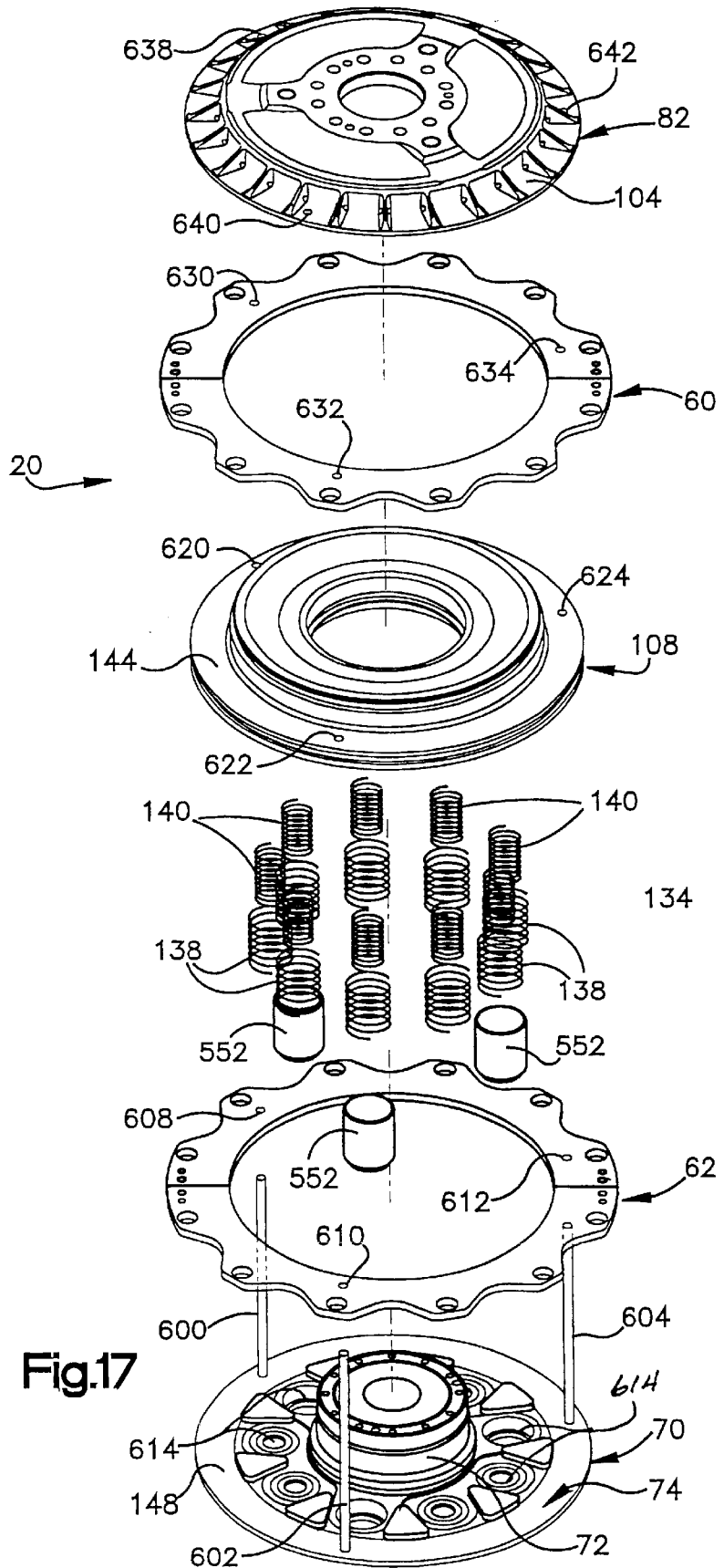
FIG. 17 is a simplified schematic illustration depicting the manner in which the clutch-brake assembly is assembled.

When the clutch-brake assembly 20 is to be assembled, the base member 70 is positioned with the central section 72 of the base member extending upward (FIG. 17). Guide members or rods 600, 602 and 604 are positioned in holes located at equally spaced apart locations about the flange section 74 of the base or hub member 70. The cylindrical guide rods 600, 602 and 604 have central axes which extend parallel to a central axis of the hub or base member 70. The central axes of the guide rods 600, 602 and 604 extend perpendicular to the friction surface 148 on the flange section 74 of the hub or base member 70.

Once the guide rods 600, 602 and 604 have been mounted on the hub or base member 70, in the manner illustrated in FIG. 17, the other components of the clutch-brake assembly 20 are positioned relative to the hub or base member. Thus, the clutch disc 62 is positioned relative to the hub or base member 70 with the guide rods 600, 602 and 604 extending through openings 608, 610 and 612 formed in the clutch disc 62. The clutch disc 62 is then moved along the guide rods 600, 602 and 604 into engagement with the friction surface 148 on the flange section 74 of the hub or base member 70. If the clutch disc 62 does not have alignment holes 608, 610, and 612, since the clutch disc is split in two like halves, the clutch disc can be installed after the clutch-brake assembly 20 is completed and guide rods removed.

The springs 134 and force transmission members 552 are then positioned in engagement with recesses 614 in the hub or base member 70. In the specific embodiment of the clutch-brake assembly illustrated in FIG. 17, there are nine sets of outer and inner springs 138 and 140 (FIGS. 5 and 15). There are three force transmission members 552 enclosing three of the sets of outer and inner springs 138 and 140. If desired, especially to facilitate installation with an interference fit, the force transmission members 552 may be mounted on the hub or base member 70 before the guide rods 600, 602 and 604 are positioned relative to the hub or base member.

After the springs 134 and force transmission members 552 have been positioned relative to the hub or base member 70, the piston 108 is positioned relative to the plurality of springs. This is accomplished by inserting the guide rods 600, 602 and 604 through openings 620, 622 and 624 in the annular flange portion 144 of the piston 108. The piston 108 is then moved axially along the guide rods 600, 602, and 604. As this occurs, the springs 134 move into recesses 554 (FIG. 15) in the piston 108 and torque transmission members 552 move into alignment with the recesses in the piston, but do not enter said recesses since the fully expanded plurality of springs 134 prevent lowering of the piston sufficiently to allow engagement. The recesses 554 into which the force transmission members 552 move are lined by the bearing or sleeve members 566 (FIG. 15).

The annular flange portion 144 of the piston 108 moves to a position adjacent to and spaced apart from the upper side of the clutch disc 62. The piston is supported with the flange portion 144 spaced apart from the clutch disc 62 by the then fully expanded springs 134.

The brake disc 60 is then positioned relative to the piston 108. To accomplish this, the guide rods 600, 602 and 604 are inserted through openings 630, 632 and 634 formed in the brake disc 60. The brake disc 60 is then moved downward (as viewed in FIG. 17) along the guide rods 600, 602 and 604 into engagement with the flange portion 144 of the piston 108. If the brake disc 60 does not have alignment holes 630, 632, and 634, since the brake disc is split in two like halves, the brake disc can be installed after the clutch-brake assembly 20 is completed and guide rods removed, except releasing air pressure must be applied to the cylinder pressure chamber 120 to open space for the brake disc.

The cylinder or cover member 82 is then positioned relative to the other components of the clutch-brake assembly. To accomplish this, the guide rods 600, 602 and 604 are inserted through openings 638, 640 and 642 in the rim portion 104 of the cylinder or cover member 82. The cover member 82 is then moved downward (as viewed in FIG. 17) into engagement with the brake disc 60.

Once the components of the clutch-brake assembly illustrated in FIG. 17 have been stacked together in the manner previously explained, they are interconnected with pins 648 and bolts 650 (FIGS. 4, 5 and 6). As is perhaps best seen in FIG. 6, the bolts 650 have a relatively long threaded portion 652. The relatively long threaded portion 652 on the bolts 650 enables them to engage internal thread convolutions on the central section 72 of the hub or base member 70 when the springs 134 are in a fully expanded condition, that is, when the springs 134 are unrestrained.

Once the threaded end portions of the bolts 650 have engaged the internal thread convolutions on the central section 72 of the hub or base member 70, the bolts are sequentially turned through a plurality of revolutions to pull the cylinder or cover member 82 toward the hub or base member 70. When the bolts 650 have been fully tightened, the cover 82 will have been pulled into solid abutting engagement with the hub or base member 70 in the manner illustrated in FIG. 5. At this time, the brake disc 62 and piston 108 will have moved axially toward the clutch disc 62 and flange section 74 of the hub or base member 70. This results in an initial compression being applied to the springs 134.

After the bolts 650 have interconnected the hub or base member 70 and cylinder or cover member 82, the guide rods 600, 602 and 604 are removed. This may be accomplished by pulling the guide rods 600, 602 and 604 axially upward (as viewed in FIG. 17) away from the hub or base member 70.

Operation

When the valve 36 is in the position shown in FIG. 1 exhausting the passage 38 in the shaft 24 and the clutch-brake assembly 20 to atmosphere, the springs 134 are effective to press the flange portion 144 (FIG. 5) on the piston 108 firmly against the brake disc 60. This presses the brake disc 60 against the rim portion 104 of the cylinder or cover member 82. Since the brake disc 60 is fixedly connected to the stationary member or frame 30 (FIGS. 1 and 2), the friction force applied against the opposite side of the brake disc by the piston 108 and cylinder or cover member 82 is effective to hold the piston against rotation.

At this time, force (torque) is transmitted between the cylinder or cover member 82 and the hub or base member 70 through friction developed at the hub or base member 70 interface with the cylinder or cover member 82 (Friction developed by the clamping force of bolts 650 when tightened), through pins 648, and through the bolts 650 (FIGS. 4, 6 and 15). In addition, force (torque) is transmitted between the piston 108 and the hub or base member 70 through the force transmission members 552 (FIGS. 15 and 16). At this time, the clutch disc 62 is released and is freely rotatable relative to the hub or base member 70.

When the shaft 24 is to be rotated, the valve 36 is actuated from the position shown in FIG. 1 to the position conducting fluid (air) under pressure to the passage 38 in the shaft 24. This fluid pressure is conducted to a radially inner manifold chamber formed by a selected one of the seal assemblies 244, 350, or 450. The fluid under pressure flows radially outward through the selected seal assembly to a manifold chamber which extends around the outside of the seal assembly. The manifold chamber around the outside of the seal assembly is connected in fluid communication with the passage 126 formed in the hub or base member 70 (FIG. 6).

Fluid pressure is conducted from the passage 126 to the piston chamber 120. The fluid pressure forces the piston 108 to move toward the right (as viewed in FIGS. 5 and 6) away from the brake disc 60. As this occurs, the flange portion 144 of the piston moves into engagement with the clutch disc 62.

Force is transmitted from the constantly rotating clutch disc 62 to the flange portion 144 of the piston 108 and to the flange section 74 of the hub or base member 70. The forces applied to the flange portion 144 of the piston 108 result in the application of force against the force transmission members 552 (FIG. 15) through the bearings or sleeves 566. The relatively soft, resilient material of the bearings or sleeves 566 is effective to absorb shock loading and minimize vibration as the clutch-brake assembly 20 is quickly operated from the disengaged condition to the engaged condition. As this occurs, the springs 134 are further compressed against the hub or base member 70 by the piston 108.

When the clutch-brake assembly 20 has been operated to the fully engaged condition, there will be no relative rotation between the clutch disc 62 and the hub or base member 70 and piston 108 of the clutch-brake assembly 20. However, at this time, the hub or base member 70, piston 108 and cylinder or cover member 82 of the clutch-brake assembly 20 will be freely rotating relative to the stationary brake disc 60.

Force is transmitted from the hub or base member 70 to the shaft 24 through the connector assembly 180 (FIGS. 7 and 8). The force (torque) transmitted to the shaft 24 through the connector assembly 180 is effective to rotate the shaft 24 about its longitudinal central axis to drive a machine, such as a metal stamping press, connected with the shaft.

When rotation of the shaft 24 is to be interrupted, the valve 36 is again actuated to effect operation of the clutch-brake assembly 20 to its disengaged condition. As this occurs, the piston chamber 120 is vented to atmosphere through the passage 126 (FIG. 6), the selected seal assembly 244, 350 or 450, and the passage 38 in the shaft 24. Venting the piston chamber 120 to atmosphere enables the springs 134 to move the piston away from the clutch disc 62 toward the brake disc 60. As this occurs, force transmitted from the brake disc 62 interrupts rotational movement of the clutch-brake assembly 20 and shaft 24.

The present invention has a plurality of features which may be used along or in combination with one or more other features. For example, the connector assembly 180 may be used alone or in combination with any one of the seal assemblies 244, 354 or 450. Anyone of the seal assemblies 244, 354 or 450 may be used without the connector assembly 180.

It is contemplated that the bearings or sleeves 566 may be used in association with force transmission members other than the force transmission members 552. The force transmission members 552 may be utilized with or without the bearing or sleeves 566. The force transmission members 552, whether used with or without the bearings or sleeves 566, may either extend around or be offset to one side of the springs 138 and 140.

The clutch-brake assembly 20 may be assembled by a method other than the method illustrated schematically in FIG. 17. Of course, the method illustrated in FIG. 17 could be used to assemble clutch-brake assemblies 20 having a construction different than the specific construction disclosed herein.

Having described the invention, the following is claimed:

1. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connectable with a source of driving force to be transmitted to the shaft, a brake surface which is disposed adjacent to said base member and is movable relative to said base member, said brake surface being connectable with a stationary member, a piston which is connected with said base member and is movable in first and second directions relative to said base member, said piston being movable in the first direction to press a first friction surface against said clutch surface to transmit force between said clutch surface and said base member, said piston being movable in the second direction to press a second friction surface against said brake surface to transmit force between said brake surface and said base member, a wedge member disposed in the central opening in said base member, an actuator operable to move said wedge member relative to said base member, said actuator being operable to move said wedge member to interconnect said base member and shaft for rotation together about a central axis of said base member, and a seal assembly disposed in the central opening in said base member between said base member and shaft, said seal assembly cooperating with said base member and shaft to at least partially define a path along which fluid under pressure is conducted.

2. An apparatus as set forth in claim 1 wherein said wedge member is disposable in either a first orientation or a second orientation in the central opening in said base member, said actuator being accessible from a first end of the central opening in said base member when said wedge member is in the first orientation in the central opening in said base member, said actuator being accessible from a second end of the central opening in said base member when said wedge member is in the second orientation in the central opening in said base member.

3. An apparatus as set forth in claim 2 further including a second actuator operable to move one portion of said seal assembly relative to another portion of said seal assembly, said seal assembly being disposable in either a first orientation or a second orientation in the central opening in said base member, said second actuator being accessible from the first end of the central opening in said base member when said seal assembly is in the first orientation in the central opening in said base member, said second actuator being accessible from the second end of the central opening in said base member when said seal assembly is in the second orientation in the central opening in said base member, said seal assembly being disposed in the first orientation of said seal assembly when said wedge member is disposed in the first orientation of said wedge member, said seal assembly being disposed in the second orientation of said seal assembly when said wedge member is disposed in the second orientation of said wedge member.

4. An apparatus as set forth in claim 1 wherein said clutch surface is freely rotatable relative to said base member when said piston is moved in the second direction to press said second friction surface against said brake surface, said base member is freely rotatable relative to said brake surface when said piston is moved in the first direction to press said first friction surface against said clutch surface.

5. An apparatus as set forth in claim 1 wherein said seal assembly includes a retaining section and a second actuator which is operable to move said retaining section to grip the shaft.

6. An apparatus as set forth in claim 1 further including a plurality of springs which urge said piston to move in one of said first and second directions relative to said base member, and a plurality of force transmission members which extend between said piston and said base member and transmit force between said piston and said base member when said first friction surface is pressed against said clutch surface, each of said force transmission members extends around and at least partially encloses one of said springs of said plurality of springs.

7. An apparatus as set forth in claim 1 further including a plurality of springs which urge said piston to move in one of said first and second directions relative to said base member, and a plurality of force transmission members which extend between said piston and said base member and transmit force between said piston and said base member when said second friction surface is pressed against said brake surface, each of said force transmission members at least partially encloses one of said springs of said plurality of springs.

8. An apparatus as set forth in claim 1 further including a reaction member to which force is transmitted when said piston is moved in one of said first and second directions relative to said base, a plurality of springs which apply force to said piston to urge said piston in one of said first and second directions relative to said base member, and a plurality of externally threaded fasteners which interconnect said reaction member and said base member, each of said externally threaded fasteners having a thread with an axial extent which enables said externally threaded fasteners to interconnect said reaction member and said base member when each of said springs of said plurality of springs is in a fully extended condition.

9. An apparatus as set forth in claim 1 wherein said wedge member has an annular cross sectional configuration in a plane transverse to a central axis of the central opening in said base member.

10. An apparatus as set forth in claim 1 further including a plurality of force transmission members which extend between said piston and said base member, and a plurality of resilient members formed of polymeric material, each of said resilient members at least partially encloses one of said force transmission members and is disposed between said one of said force transmission members and at least one of said piston and said base member.

11. An apparatus as set forth in claim 10 wherein each of said force transmission members is slidable along a surface of one of said resilient members to facilitate relative movement between said piston and said base member.

12. An apparatus as set forth in claim 10 further including a plurality of springs which urge said piston to move in one of said first and second directions relative to said base member, each of said force transmitting members and each of said resilient members extends around and at least partially encloses one of said springs of said plurality of springs.

13. An apparatus as set forth in claim 1 further including a plurality of force transmission members which extend between said piston and said base member, and a plurality of bodies of material having a modulus of elasticity which is less than a modulus of elasticity of said force transmission members, a modulus of elasticity of said base member, and a modulus of elasticity of said piston, said bodies of material being disposed between said force transmission members and at least one of said piston and said base member.

14. An apparatus as set forth in claim 13 wherein each of said force transmission members has a surface which is slidable along a surface on one of said bodies of material to facilitate relative movement between said piston and said base member.

15. An apparatus as set forth in claim 14 further including a plurality of springs which urge said piston to move in one of said first and second directions relative to said base member, each of said force transmitting members and each of said bodies of material extends around and at least partially encloses one of said springs of said plurality of springs.

16. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connectable with a source of driving force to be transmitted to the shaft, a brake surface which is disposed adjacent to said base member and is movable relative to said base member, said brake surface being connectable with a stationary member, a piston which is connected with said base member and is movable in first and second directions relative to said base member, said piston being movable in the first direction to press a first friction surface against said clutch surface to transmit force between said clutch surface and said base member, said piston being movable in the second direction to press a second friction surface against said brake surface to transmit force between said brake surface and said base member, and a seal assembly cooperating with said base member and shaft to at least partially define a path along which fluid under pressure is conducted, said seal assembly includes a retaining section and an actuator which is movable relative to said retaining section to press said retaining section against at least a surface on one of said shaft and base member to retard movement of said seal assembly relative to at least said one of said shaft and base member.

17. An apparatus as set forth in claim 16 wherein said retaining section and shaft are formed of metal, said actuator being effective to press said metal retaining section against the metal of at least said one of said shaft and base member to provide metal-to-metal engagement between said seal assembly and at least said one of said shaft and base member.

18. An apparatus as set forth in claim 16 wherein said retaining section of said seal assembly tapers in one direction and said actuator of said seal assembly tapers in another direction opposite to the one direction, said actuator and said retaining section of said seal assembly being pressed together to deflect said retaining section of said seal assembly.

19. An apparatus as set forth in claim 16 further including a plurality of force transmitting elements extending into said retaining section and said actuator of said seal assembly, said force transmitting elements being movable to press said retaining section and actuator together.

20. An apparatus as set forth in claim 16 further including first and second annular seal elements which are disposed in first and second annular recesses in said seal assembly, said actuator being operable to decrease the size of said first and second annular recesses to expand said first annular seal element radially outward into sealing engagement with said base and to expand said second annular seal element radially inward into sealing engagement with the shaft.

21. An apparatus as set forth in claim 16 wherein said seal assembly includes a first annular end section disposed adjacent to one end of said seal assembly, a second annular end section disposed adjacent an end of said seal assembly opposite from said one end of said seal assembly, and a plurality of connectors which extend between said first and second annular end sections, said connectors being movable to urge said first and second annular end sections toward each other and to press said retaining section and actuator against each other.

22. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connectable with a source of driving force to be transmitted to the shaft, a brake surface which is disposed adjacent to said base member and is movable relative to said base member, said brake surface being connectable with a stationary member, a piston which is connected with said base member and is movable in first and second directions relative to said base member, said piston being movable in the first direction under the influence of fluid pressure applied to said piston to press a first friction surface against said clutch surface to transmit force between said clutch surface and said base member, said piston being movable in the second direction to press a second friction surface against said brake surface to transmit force between said brake surface and said base member, a plurality of springs which urge said piston to move in one of said first and second directions relative to said base member, and a plurality of force transmission members which extend between said piston and said base member and transmit force between said piston and said base member, each of said force transmission members extends around and at least partially encloses one of said springs of said plurality of springs.

23. An apparatus as set forth in claim 22 further including a plurality of bearings disposed between inner and outer side surfaces of said force transmission members and at least one of said piston and said base member to facilitate relative movement between said piston and said base member.

24. An apparatus as set forth in claim 22 further including a plurality of bodies of resilient material disposed between surfaces of said force transmission members and at least one of said piston and said base member to reduce shock loading during operation of said apparatus.

25. An apparatus as set forth in claim 22 further including a reaction member to which force is transmitted when said piston is moved in one of said first and second directions relative to said base member, and a plurality of externally threaded fasteners which interconnect said reaction member and said base member, each of said externally threaded fasteners having a thread with an axial extent which enables said externally threaded fasteners to interconnect said reaction member and said base member when each of said springs of said plurality of springs is in a fully extended condition.

26. An apparatus as set forth in claim 22 further including a wedge member disposed in the central opening in said base member, and an actuator operable to move said wedge member relative to said base member to interconnect said base member and shaft for rotation together about a central axis of said base member.

27. An apparatus as set forth in claim 26 further including a seal assembly disposed in the central opening in said base member and cooperating with said base member and shaft to at least partially define a path along which fluid pressure is conducted, said seal assembly includes first and second annular recesses in said seal assembly and an actuator which is operable to decrease the size of said first and second annular recesses to expand seal elements disposed in said first and second annular recesses.

28. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connectable with a source of driving force to be transmitted to the shaft, a brake surface which is disposed adjacent to said base member and is movable relative to said base member, said brake surface being connectable with a stationary member, a piston which is connected with said base member and is movable in first and second directions relative to said base member, said piston being movable in the first direction to press a first friction surface against said clutch surface to transmit force between said clutch surface and said base member, said piston being movable in the second direction to press a second friction surface against said brake surface to transmit force between said brake surface and said base member, a retainer assembly disposed in the central opening in said base member, said retainer assembly includes a first actuator which is operable to actuate said retainer assembly to retain said base member and shaft against relative movement, and a seal assembly disposed in the central opening in said base member, said seal assembly includes a second actuator which is operable to actuate said seal assembly to retain said seal assembly in a desired position relative to said base member and shaft.

29. An apparatus as set forth in claim 28 wherein said seal assembly includes an annular seal element which is disposed in an annular recess in said seal assembly, said second actuator being operable to decrease the size of said annular recess to expand said annular seal element radially inward into sealing engagement with the shaft.

30. An apparatus as set forth in claim 28 wherein said retainer assembly includes an annular wedge member, said first actuator being operable to move said annular wedge member relative to said base member to contract said retainer assembly to firmly grip said shaft.

31. An apparatus as set forth in claim 28 further including a plurality of springs which urge said piston to move in one of said first and second directions relative to said base member, and a plurality of torque transmission members which extend between said piston and said base member and transmit force from said piston to said base member when said first friction surface is pressed against said clutch surface, each of said torque transmission members extend around and at least partially encloses one of said springs of said plurality of springs.

32. An apparatus as set forth in claim 28 wherein said first actuator includes a first wedge member and means for moving said first wedge member relative to said base member to contact said retainer assembly, said second actuator includes a second wedge member and means for moving said second wedge member relative to said base member to contract said seal assembly.

33. An apparatus as set forth in claim 28 wherein said retainer assembly includes first and second wedge members, said first actuator being operable to move said first and second wedge members in opposite directions relative to said base member to actuate said retainer assembly to retain said base member and shaft against relative movement.

34. An apparatus as set forth in claim 28 wherein said retainer assembly is disposable in either a first orientation or a second orientation in said central opening in said base member, said first actuator being accessible from a first end of the central opening in said base member when said retainer assembly is disposed in the first orientation in the central opening in said base member, said first actuator being accessible from a second end of the central opening in said base member when said retainer assembly is in the second orientation in the central opening in said base member.

35. An apparatus as set forth in claim 34 wherein said seal assembly is disposable in either a first orientation or a second orientation in the central opening in said base member, said second actuator being accessible from the first end of the central opening in said base member when said seal assembly is in the first orientation in the central opening in said base member, said second actuator being accessible from the second end of the central opening in said base member when said seal assembly is in the second orientation in said base member.

36. An apparatus as set forth in claim 35 wherein said seal assembly is disposed in the first orientation of said seal assembly when said retainer assembly is disposed in the first orientation of said retainer assembly, said seal assembly being disposed in the second orientation of said seal assembly when said retainer assembly is disposed in the second orientation of said retainer assembly.

37. An apparatus as set forth in claim 28 wherein said retainer assembly has an annular configuration and is expanded radially outward to grip said base member and is expanded radially inward to grip the shaft upon operation of said first actuator.

38. An apparatus as set forth in claim 37 wherein said seal assembly has an annular configuration and is expanded radially outward against said base member and is expanded radially inward against the shaft upon operation of said second actuator.

39. An apparatus as set forth in claim 28 wherein said seal assembly includes a wedge member, said second actuator being operable to move said wedge member to actuate said seal assembly to retain said seal assembly and shaft against relative movement.

40. An apparatus as set forth in claim 39 wherein said wedge member has an annular configuration.

41. An apparatus as set forth in claim 28 further including a plurality of force transmission members which extend between said piston and said base member, and a plurality of resilient members formed of polymeric material, each of said resilient members at least partially encloses one of said force transmission members and is disposed between said one of said force transmission members and at least one of said piston and said base member.

42. An apparatus as set forth in claim 41 wherein each of said force transmission members is slidable along a surface of one of said resilient members to facilitate relative movement between said piston and said base member.

43. An apparatus as set forth in claim 41 further including a plurality of springs which urge said piston to move in one of said first and second directions relative to said base member, each of said force transmitting members and each of said resilient members extends around and at least partially encloses one of said springs of said plurality of springs.

44. An apparatus as set forth in claim 28 further including a plurality of force transmission members which extend between said piston and said base member, and a plurality of bodies of material having a modulus of elasticity which is less than a modulus of elasticity of said force transmission members, a modulus of elasticity of said base member, and a modulus of elasticity of said piston, said bodies of material being disposed between said force transmission members and at least one of said piston and said base member.

45. An apparatus as set forth in claim 44 wherein each of said force transmission members has a surface which is slidable along a surface on one of said bodies of material to facilitate relative movement between said piston and said base member.

46. An apparatus as set forth in claim 45 further including a plurality of springs which urge said piston to move in one of said first and second directions relative to said base member, each of said force transmitting members and each of said bodies of material extends around and at least partially encloses one of said springs of said plurality of springs.

47. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connectable with a source of driving force to be transmitted to the shaft, a brake surface which is disposed adjacent to said base member and is movable relative to said base member, said brake surface being connectable with a stationary member, a piston which is connected with said base member and is movable in first and second directions relative to said base member, said piston being movable in the first direction to press a first friction surface against said clutch surface to transmit force between said clutch surface and said base member, said piston being movable in the second direction to press a second friction surface against said brake surface to transmit force between said brake surface and said base member, a plurality of force transmission members which extend between said piston and said base member and transmit force between said piston and said base member when said first friction surface is pressed against said clutch surface, and a plurality of bodies of material having a modulus of elasticity which is less than a modulus of elasticity of said force transmission members, a modulus of elasticity of said base member, and a modulus of elasticity of said piston, said bodies of material being disposed between said force transmission members and at least one of said piston and said base member.

48. An apparatus as set forth in claim 47 wherein each of said force transmission members has a surface which is slidable along a surface on one of said bodies of material to facilitate relative movement between said piston and said base member.

49. An apparatus as set forth in claim 47 wherein said plurality of force transmission members transmit force between said piston and said base member when said second friction surface is pressed against said brake surface.

50. An apparatus as set forth in claim 49 wherein each of said force transmission members is fixedly connected to said base member and each of said bodies of material is disposed between one of said force transmission members and said piston.

51. An apparatus as set forth in claim 49 wherein said force transmission members, said base member, and said piston are formed of metal, said bodies of material are formed of a polymeric material.

52. An apparatus as set forth in claim 49 further including a wedge member disposed in the central opening in said base member, and an actuator operable to move said wedge member relative to said base member to interconnect said base member and shaft for rotation together about a central axis of said base member.

53. An apparatus as set forth in claim 49 further including a seal assembly disposed in the central opening in said base member and cooperating with said base member to at least partially define a path along which fluid pressure is conducted, said seal assembly includes first and second annular recesses in said seal assembly and an actuator which is operable to decrease the size of said first and second annular recesses to expand seal elements disposed in said first and second annular recesses.

54. An apparatus as set forth in claim 49 further including a plurality of springs which urge said piston to move in one of said first and second directions relative to said base member, each of said force transmission members extends around and at least partially encloses one of said springs of said plurality of springs.

55. An apparatus as set forth in claim 54 wherein each of said bodies of material extends around and at least partially encloses one of said force transmission members of said plurality of force transmission members.

56. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connectable with a source of driving force to be transmitted to the shaft, a brake surface which is disposed adjacent to said base member and is movable relative to said base member, said brake surface being connectable with a stationary member, a piston which is connected with said base member and is movable in first and second directions relative to said base member, said piston being movable in the first direction to press a first friction surface against said clutch surface to transmit force between said clutch surface and said base member, said piston being movable in the second direction to press a second friction surface against said brake surface to transmit force between said brake surface and said base member, a plurality of force transmission members which extend between said piston and said base member and transmit force between said piston and said base member when said first friction surface is pressed against said clutch surface, and a plurality of resilient members formed of polymeric material, each of said resilient members at least partially encloses one of said force transmission members and is disposed between said one of said force transmission members and at least one of said piston and said base member.

57. An apparatus as set forth in claim 56 wherein each of said force transmission members has a surface which is slidable along a surface on one of said resilient members to facilitate relative movement between said piston and said base member.

58. An apparatus as set forth in claim 56 wherein said resilient members are resiliently deformable under the influences of force transmitted between said piston and said base member to reduce shock loading during operation of said apparatus.

59. An apparatus as set forth in claim 56 wherein each of said force transmission members is fixedly connected to said base member and each of said resilient members is disposed between one of said force transmission members and said piston.

60. An apparatus as set forth in claim 56 further including a plurality of springs which urge said piston to move in one of said first and second directions relative to said base member, each of said force transmission members extends around and at least partially encloses one of said springs of said plurality of springs.

61. An apparatus as set forth in claim 56 further including a wedge member disposed in the central opening in said base member, and an actuator operable to move said wedge member relative to said base member to interconnect said base member and shaft for rotation together about a central axis of said base member.

62. An apparatus as set forth in claim 56 further including a seal assembly disposed in the central opening in said base member and cooperating with said base member to at least partially define a path along which fluid pressure is conducted, said seal assembly includes first and second annular recesses in said seal assembly and an actuator which is operable to decrease the size of said first and second annular recesses to expand seal elements disposed in said first and second annular recesses.

63. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connectable with a source of driving force to be transmitted to the shaft, a brake surface which is disposed adjacent to said base member and is movable relative to said base member, said brake surface being connectable with a stationary member, a piston which is connected with said base member and is movable in first and second directions relative to said base member, said piston being movable in the first direction to press a first friction surface against said clutch surface to transmit force between said clutch surface and said base member, said piston being movable in the second direction to press a second friction surface against said brake surface to transmit force between said brake surface and said base member, a retainer assembly disposed in the central opening in said base member to retain said base member and shaft against relative movement, a seal assembly disposed in the central opening in said base member, a plurality of springs which urge said piston to move in one of said first and second directions relative to said base member, and a plurality of force transmission members which transmit force between said piston and base member when said first friction surface is pressed against said clutch surface, each of said force transmission members extends around and at least partially encloses one of said springs of said plurality of springs.

64. An apparatus as set forth in claim 63 wherein said seal assembly includes an annular seal element which is disposed in an annular recess in said seal assembly, said seal assembly includes an actuator which is operable to decrease the size of said annular recess to expand said annular seal element radially inward into sealing engagement with the shaft.

65. An apparatus as set forth in claim 63 wherein said retainer assembly includes an annular wedge member and an actuator which is operable to move said annular wedge member relative to said base member to contract said retainer assembly to firm grip said shaft.

66. An apparatus as set forth in claim 63 wherein said retainer assembly has an annular configuration and is expandable radially outward to grip said base member and is expandable radially inward to grip the shaft.

67. An apparatus as set forth in claim 63 wherein said seal assembly has an annular configuration and is expandable radially outward against said base member and is expandable radially inward against the shaft.

68. An apparatus as set forth in claim 63 wherein said retainer assembly includes first and second wedge members and an actuator, said actuator being operable to move said first and second wedge members in opposite directions relative to said base members in opposite directions relative to said base member to actuate said retainer assembly to retain said base member and shaft against relative movement.

69. An apparatus as set forth in claim 63 wherein said seal assembly includes a wedge member and an actuator, said actuator being operable to move said wedge member to actuate said seal assembly to retain said seal assembly and shaft against relative movement.

70. An apparatus as set forth in claim 63 further including a plurality of resilient members formed of polymeric material, each of said resilient members at least partially encloses one of said force transmission members and is disposed between said one of said force transmission members and at least one of said piston and said base member.

71. An apparatus as set forth in claim 63 wherein each of said force transmission members is slidable along a surface of one of said resilient members to facilitate relative movement between said piston and said base member.

72. An apparatus as set forth in claim 63 including a plurality of bodies of material having a modulus of elasticity which is less than a modulus of elasticity of said force transmission members, a modulus of elasticity of said base member, and a modulus of elasticity of said piston, said bodies of material being disposed between said force transmission members and at least one of said piston and said base member.

73. An apparatus as set forth in claim 72 wherein each of said force transmission members has a surface which is slidable along a surface on one of said bodies of material to facilitate relative movement between said piston and said base member.

74. An apparatus for transmitting force to rotate a shaft and for transmitting force to retain the shaft against rotation, said apparatus comprising a base member having a central opening which receives the shaft, a clutch surface which is disposed adjacent to said base member and is movable relative to said base member, said clutch surface being connectable with a source of driving force to be transmitted to the shaft, a brake surface which is disposed adjacent to said base member and is movable relative to said base member, said brake surface being connectable with a stationary member, a piston which is connected with said base member and is movable in first and second directions relative to said base member, said piston being movable in the first direction to press a first friction surface against said clutch surface to transmit force between said clutch surface and said base member, said piston being movable in the second direction to press a second friction surface against said brake surface to transmit force between said brake surface and said base member, a retainer assembly disposed in the central opening in said base member to retain said base member and shaft against relative movement, and a seal assembly disposed in the central opening in said base member, said seal assembly includes a passage through which fluid is conducted during movement of said piston in at least one of said first and second directions.

75. An apparatus as set forth in claim 74 wherein said seal assembly includes an annular seal element which is disposed in an annular recess in said seal assembly, said seal assembly includes an actuator which is operable to decrease the size of said annular recess to expand said annular seal element radially inward into sealing engagement with the shaft.

76. An apparatus as set forth in claim 74 wherein said retainer assembly includes an annular wedge member, said retainer assembly includes an actuator which is operable to move said annular wedge member relative to said base member to contract said retainer assembly to firmly grip said shaft.

77. An apparatus as set forth in claim 74 further including a plurality of springs which urge said piston to move in one of said first and second directions relative to said base member, and a plurality of force transmission members which extend between said piston and said base member and transmit force from said piston to said base member when said first friction surface is pressed against said clutch surface, each of said force transmission members extend around and at least partially encloses one of said springs of said plurality of springs.

78. An apparatus as set forth in claim 74 wherein said retainer assembly includes a first wedge member and means for moving said first wedge member relative to said base member to contract said retainer assembly, said seal assembly includes a second wedge member and means for moving said second wedge member relative to said base member to contract said seal assembly.

79. An apparatus as se forth in claim 74 wherein said retainer assembly has an annular configuration and is expandable radially outward to grip and base member and is expandable radially inward to grip the shaft.

80. An apparatus as set forth in claim 74 wherein said seal assembly has an annular configuration and is expandable radially outward against said base member and is expandable radially inward against the shaft.

81. An apparatus as set forth in claim 74 wherein said retainer assembly includes first and second wedge members and an actuator, said actuator being operable to move said first and second wedge members in opposite directions relative to said base member to actuate said retainer assembly to retain said base member and shaft against relative movement.

82. An apparatus as set forth in claim 74 wherein said seal assembly includes a wedge member and an actuator, said actuator being operable to move said wedge member to actuate said seal assembly to retain said seal assembly and shaft against relative movement.

83. An apparatus as set forth in claim 74 further including a plurality of force transmission members which extend between said piston and said base member, and a plurality of resilient members formed of polymeric material, each of said resilient members at least partially encloses one of said force transmission members and is disposed between said one of said force transmission members and at least one of said piston and said base member.

84. An apparatus as set forth in claim 83 wherein each of said force transmission members is slidable along a surface of one of said resilient members to facilitate relative movement between said piston and said base member.

85. An apparatus as set forth in claim 83 further including a plurality of springs which urge said piston to move in one of said first and second directions relative to said base member, each of said force transmitting members and each of said resilient members extends around and at least partially encloses one of said springs of said plurality of springs.

* * * * *